US012718189B2

(12) United States Patent
Volkerink et al.

(10) Patent No.: US 12,718,189 B2
(45) Date of Patent: Aug. 25, 2026

(54) HAZARDOUS MATERIAL MONITORING AND DETECTING RULE VIOLATIONS FOR GROUPED ASSETS USING WIRELESS TRACKING DEVICES

(71) Applicant: Trackonomy Systems, Inc., San Jose, CA (US)

(72) Inventors: Hendrik J Volkerink, Palo Alto, CA (US); Ajay Khoche, West San Jose, CA (US); Taylor Albert Gregoire-Wright, Palo Alto, CA (US)

( * ) Notice: Subject to any disclaimer, the term of this patent is extended or adjusted under 35 U.S.C. 154(b) by 95 days.

(21) Appl. No.: 17/733,994

(22) Filed: Apr. 29, 2022

(65) Prior Publication Data

US 2022/0374826 A1 Nov. 24, 2022

Related U.S. Application Data

(60) Provisional application No. 63/291,467, filed on Dec. 20, 2021, provisional application No. 63/215,379, (Continued)

(51) Int. Cl.
*G06Q 10/087* (2023.01)
*H04W 4/02* (2018.01)

(52) U.S. Cl.
CPC .......... *G06Q 10/087* (2013.01); *H04W 4/023* (2013.01)

(58) Field of Classification Search
CPC ............. G06Q 10/087; G06Q 20/3278; G06Q 20/3274; G06Q 20/203; G06Q 30/0223; G06Q 10/0833; G06Q 10/08; G06Q 10/20; G06Q 10/30; H04W 4/023; H04W 4/008; H04W 4/80; H04W 4/029; H04W 4/38; H04W 4/35; H04W 16/20; H04W 4/02; H04W 4/025; H04W 64/003; H04W 4/33; G11B 20/00195; H04M 3/42119; H04M 2250/04; Y10S 439/955; Y10S 902/04; Y10S 707/949; G03G 21/1657; G06K 19/045; G06K 19/145; G09F 3/0335; G06F 19/323; G06F 2212/178; G07G 1/0045; G07G 1/009; G16H 10/65; H01H 2300/032; H04Q 1/138; H04Q 2209/47;

(Continued)

(56) References Cited

U.S. PATENT DOCUMENTS

2005/0200487 A1* 9/2005 O'Donnell ......... G08B 21/0227 340/573.1
2007/0229350 A1 10/2007 Scalisi et al.

(Continued)

OTHER PUBLICATIONS

PCT Application No. PCT/US2022/027158, International Search Report and Written Opinion, dated Sep. 7, 2022.

*Primary Examiner* — Avia Salman

(57) ABSTRACT

A tracking system is configured to track a group of assets detect violations of rules associated with the group of assets. The tracking system includes a control system on a server and a plurality of tracking devices. Each tracking device of the plurality of tracking devices associated with an asset of a group of assets, each tracking device comprising a first type of wireless communication system. The plurality of tracking devices determine that a violation of a rule for the group of assets has occurred based on wireless communications between the tracking devices using the respective first wireless communication systems.

20 Claims, 23 Drawing Sheets

Related U.S. Application Data filed on Jun. 25, 2021, provisional application No. 63/181,961, filed on Apr. 29, 2021.

(58) Field of Classification Search

CPC ....... Y02P 90/845; Y04S 10/56; G06N 20/00; G06N 3/006; H04L 41/0806; H04L 41/0869; H04L 41/12; H04L 41/22; H04L 41/24; H04L 67/12; H04L 67/52; H04L 12/6418; H04L 65/1059; H04L 65/75; H04L 65/765; G16Y 20/10; G16Y 30/00; G16Y 40/35; G16Y 40/60

USPC ........................................................... 705/28

See application file for complete search history.

(56) References Cited

U.S. PATENT DOCUMENTS

2015/0097678 A1 4/2015 Sloo et al.
2017/0277920 A1* 9/2017 DeYoung ............... G06Q 10/08
2019/0378391 A1* 12/2019 Miniard ............. G08B 21/0227
2020/0252780 A1 8/2020 McClendon, IV et al.
2022/0309899 A1* 9/2022 Volkerink ............ G08B 21/182

* cited by examiner 30
32
34
36
40
44
46
48
34'
40'
32'

Wireless Transducing Circuit
72
74
Antenna 1
84
Antenna N
88
Transducer(s)/
Energy
Harvesting
94
Circuit 1
82
Circuit N
86
Processor
90
92
Energy Storage
Component(s)
Memory
96
Control Code
ID
70
99
98

100
102
104
108
106
Wireless Transducing
Circuit Components
Wireless Transducing
Circuit Components
7A -
7D
7A -
7D

1161

HAZARDOUS MATERIAL MONITORING AND DETECTING RULE VIOLATIONS FOR GROUPED ASSETS USING WIRELESS TRACKING DEVICES

CROSS-REFERENCE TO RELATED APPLICATIONS

This application claims priority to U.S. Provisional Patent Application No. 63/181,961, filed on Apr. 29, 2021, U.S. Provisional Patent Application No. 63/291,467, filed on Dec. 20, 2021, and U.S. Provisional Patent Application No. 63/215,379, filed on Jun. 25, 2021, all of which are incorporated herein in their entirety.

FIELD OF THE DISCLOSURE

This disclosure generally relates to wireless internet of things (IOT) devices and, in particular, to tracking multiple assets using wireless IOT devices.

BACKGROUND

When managing a group of assets, there may be rules and restrictions to how the assets may be stored, grouped, or interact with each other. For example, a warehouse or factory may be restricted from storing containers containing different types of hazardous waste in the same area. It is desirable to automatically track assets in a way that alerts users of potential violations to rules and restrictions for the assets.

SUMMARY

Disclosed herein is a method and system thereof for detecting violations of rules for a group of assets. Tracking devices are used to detect when assets in the group of assets are in proximity to each other. In the case where certain types of assets cannot be mixed with other types of assets, according to the rules for the group of assets, the tracking devices are configured to detect the improper mixing of assets. Mixing assets as discussed herein, refers to bringing assets within a threshold distance from each other, according to some embodiments. In other embodiments, the assets may be containers that store materials. The tracking devices may be configured to store the type of material and track environmental conditions for the assets.

BRIEF DESCRIPTION OF THE DRAWINGS

FIGS. 10A-10E are diagrammatic views of exemplary use cases for a distributed agent operating system, according to some embodiments.

DETAILED DESCRIPTION

Figure 1A:
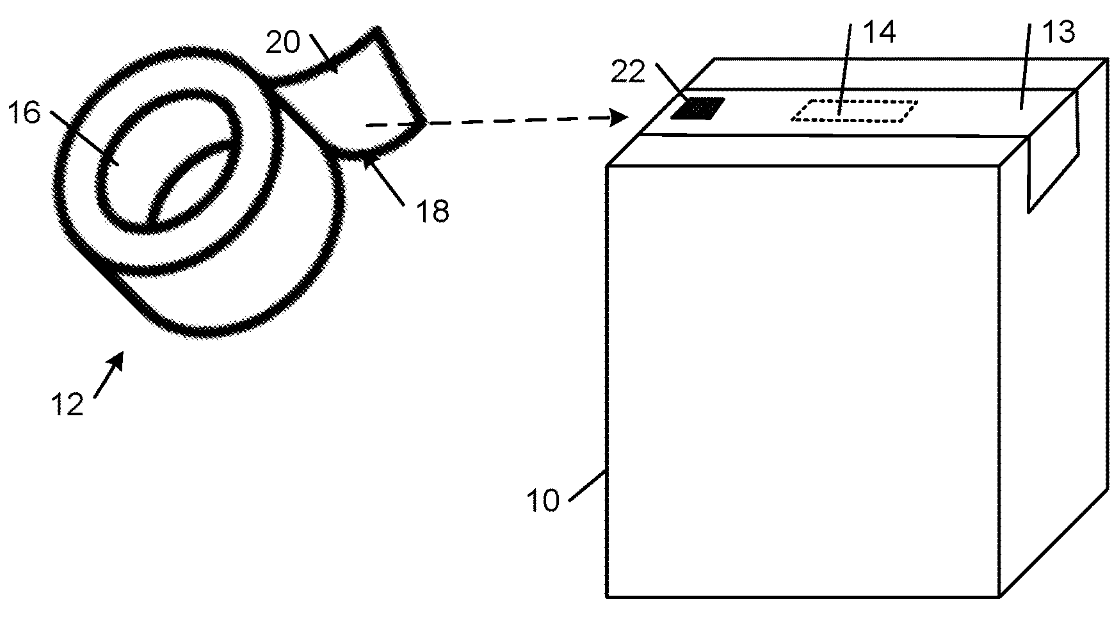
FIG. 1A is a diagrammatic view of an asset that has been sealed for shipment using a segment of an example adhesive tape platform dispensed from a roll, according to some embodiments.

Disclosed herein is a method and system thereof for detecting rule violations for a group of assets using wireless tracking devices (also referred to herein as "tracking devices" or "wireless IOT devices"), according to some embodiments. Each tracking device may be associated with one or more assets of the group of assets that are being monitored. The tracking devices are configured to wirelessly communicate with each other and other nodes of a wireless tracking system. Based on wireless communication between tracking devices, gateway devices, client devices, and/or other wireless nodes of the wireless tracking system, the wireless tracking system determines when a violation of a predetermined rule for the group of assets. In some embodiments, the rule determines which assets are allowed to be mixed in with the group of assets. In further embodiments, the rule establishes a threshold distance for assets of a first type and assets of a second type. Assets of a first type must be located further than the threshold distance from assets of the second type, according to some embodiments. This rule helps ensure that undesirable mixing of assets does not occur.

In other embodiments, the rule establishes that each assets in the group of assets must be within a threshold distance from another asset in the group of assets. This rule helps ensure that assets that should always be grouped together do not become separated.

When the wireless tracking system detects a violation of a rule for the group of assets, an alert may be issued from one of the nodes of the wireless tracking system. For example, a user may receive a notification on a client device alerting them of the violation of the rule. In further embodiments, the user may also receive instructions on how to resolve the violation of the rule.

In some embodiments, the wireless IOT device or tracking device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
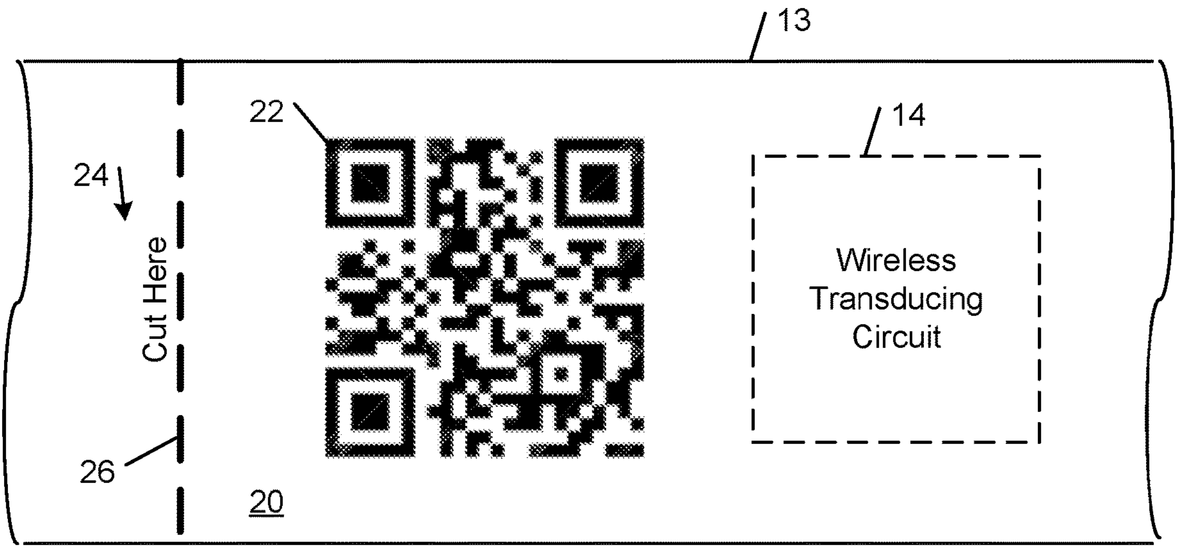
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figures 2, 3, 4:
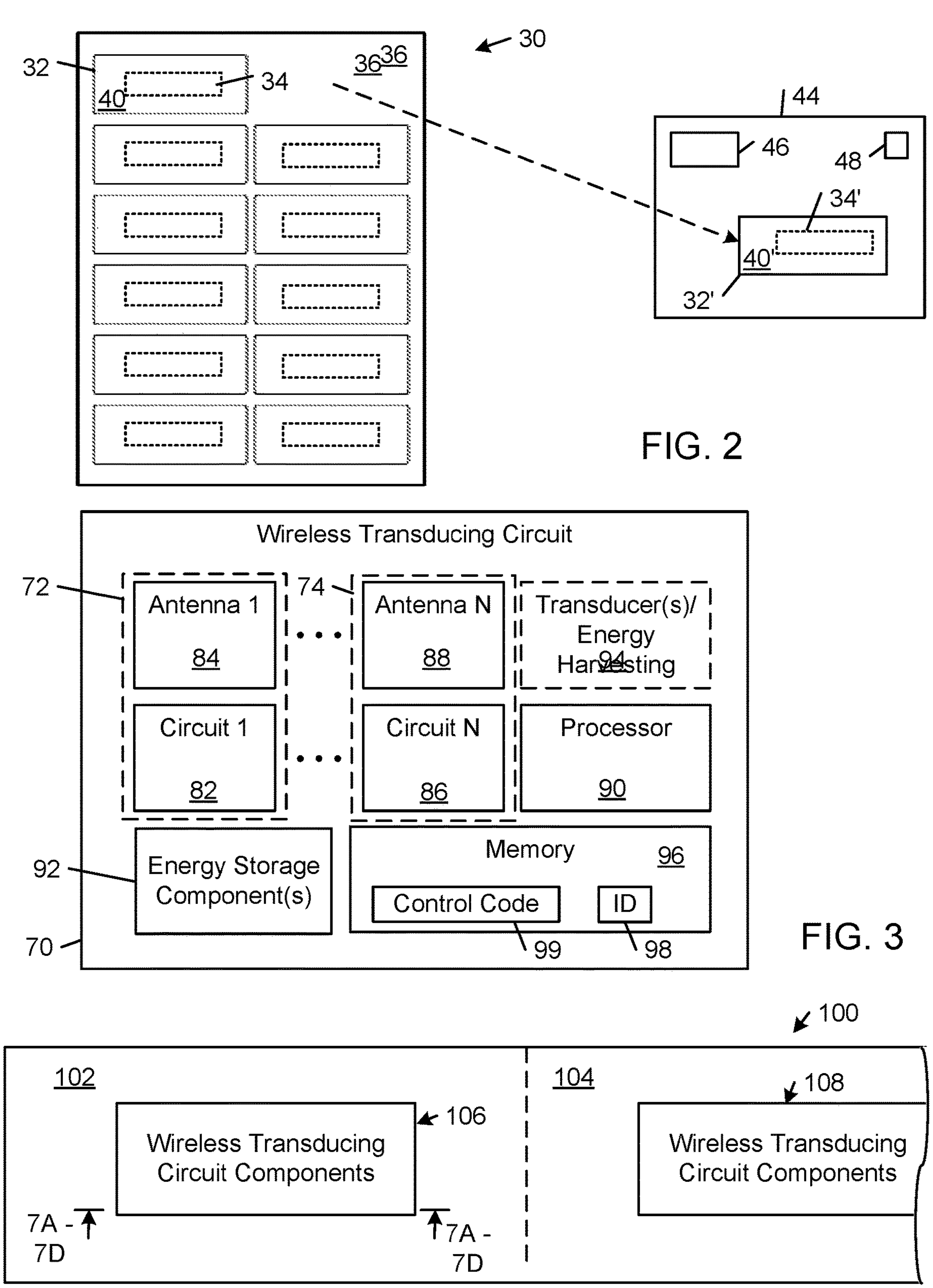
FIG. 2 is a diagrammatic view of an example of an envelope carrying a segment of an example adhesive tape platform dispensed from a backing sheet, according to some embodiments.
FIG. 3 is a schematic view of an example segment of an adhesive tape platform, according to some embodiments.
FIG. 4 is a diagrammatic top view of a length of an example adhesive tape platform, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
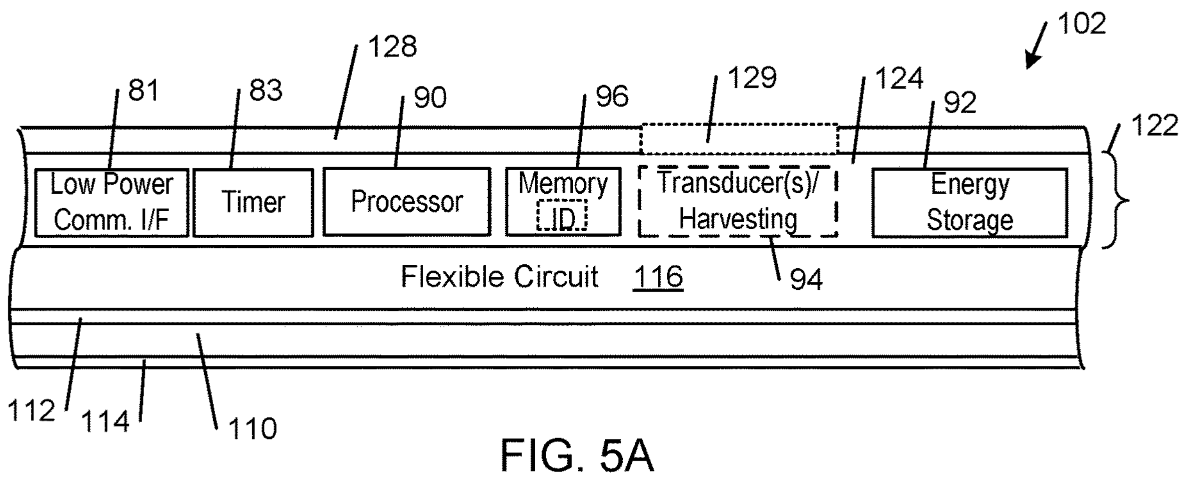
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
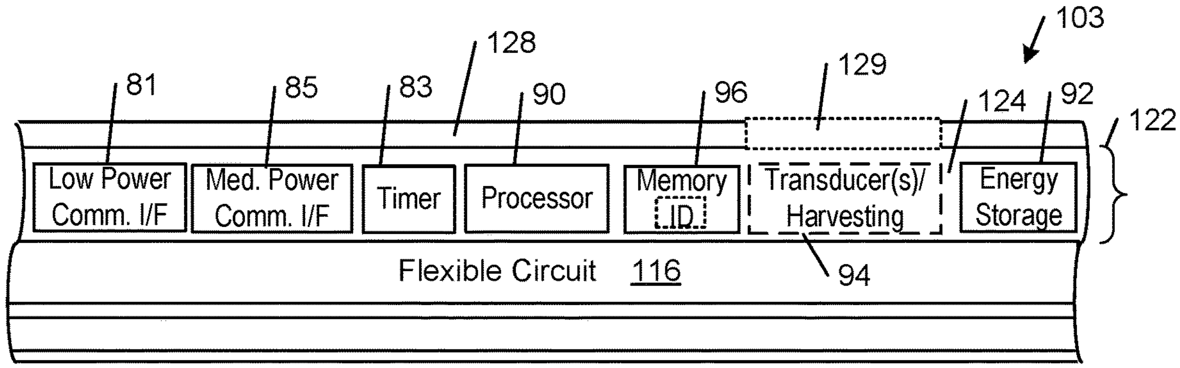

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
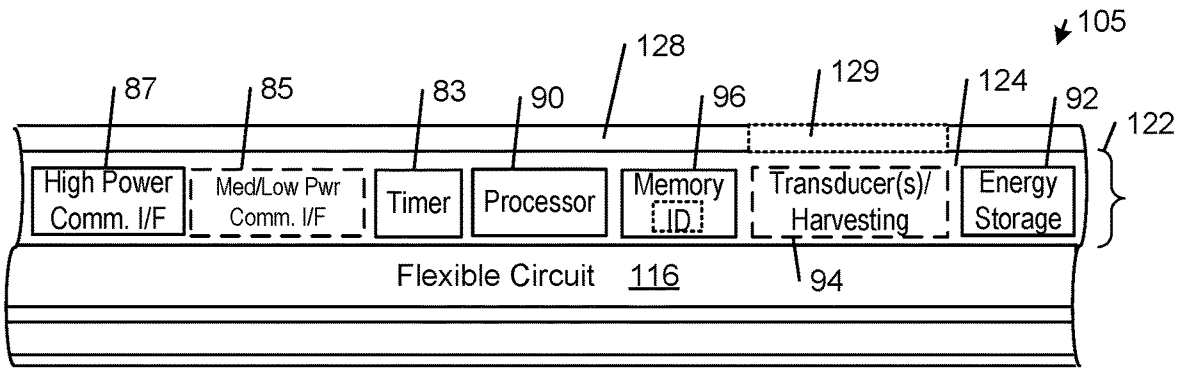

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figures 6A, 6B, 6C:
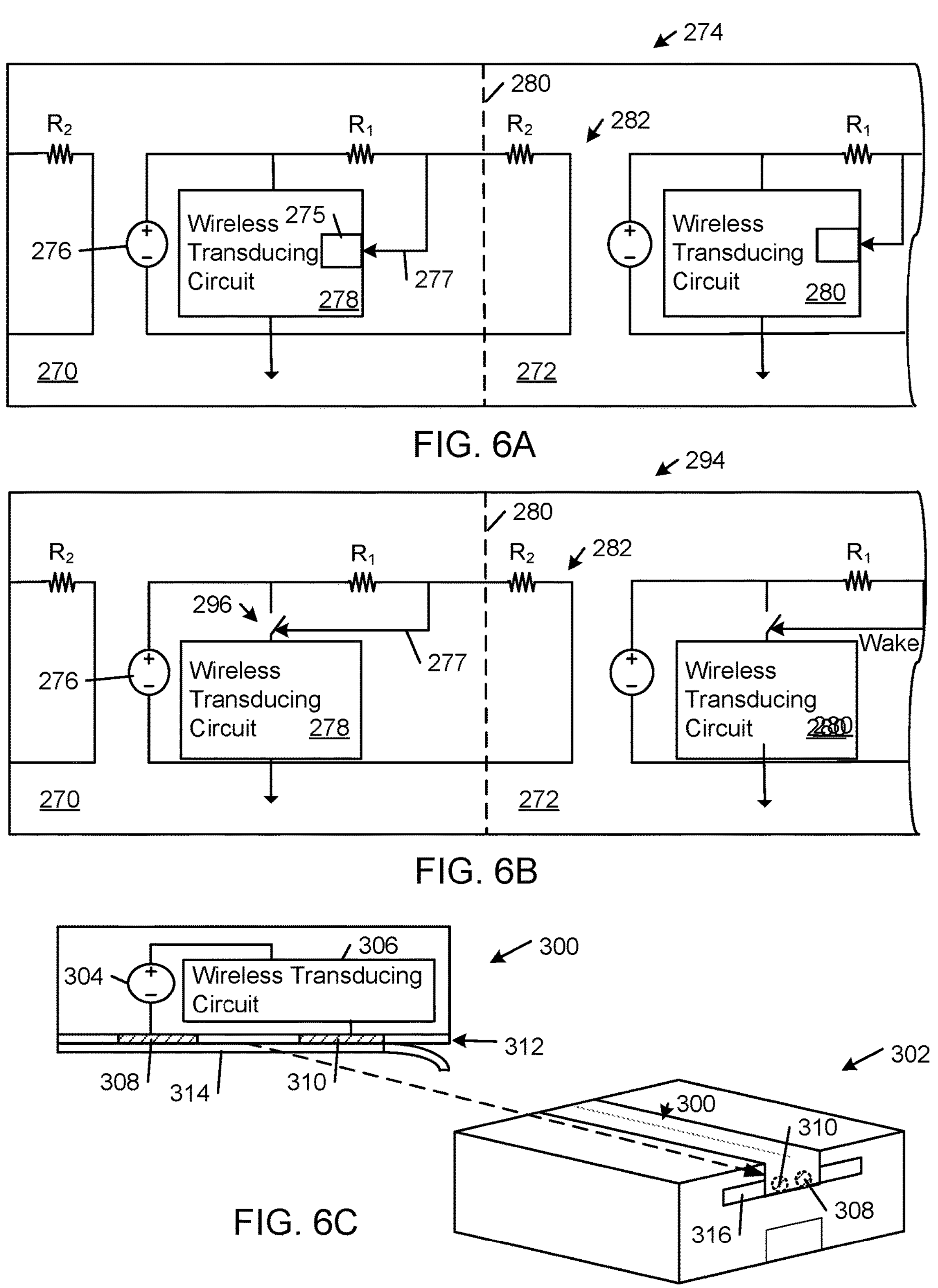
FIGS. 6A-6B are diagrammatic top views of a length of an example adhesive tape platform, according to some embodiments.
FIG. 6C is a diagrammatic view of a length of an example adhesive tape platform adhered to an asset, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
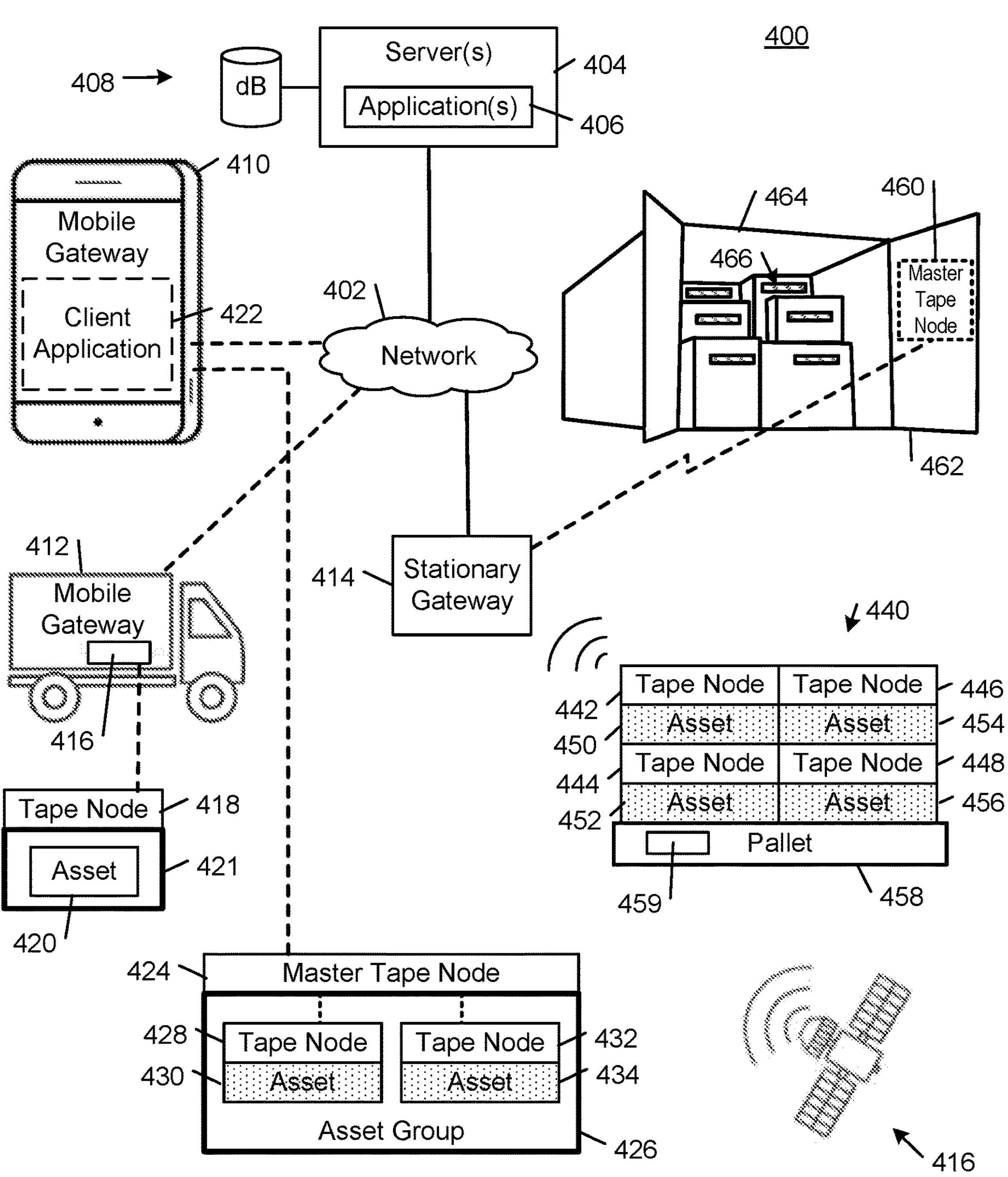
FIG. 7 is a diagrammatic view of an example of a network environment supporting communications with segments of an adhesive tape platform, according to some embodiments.

FIG. 7 shows an example network communications environment 400 (also referred to herein as an "TOT system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figures 8, 9:
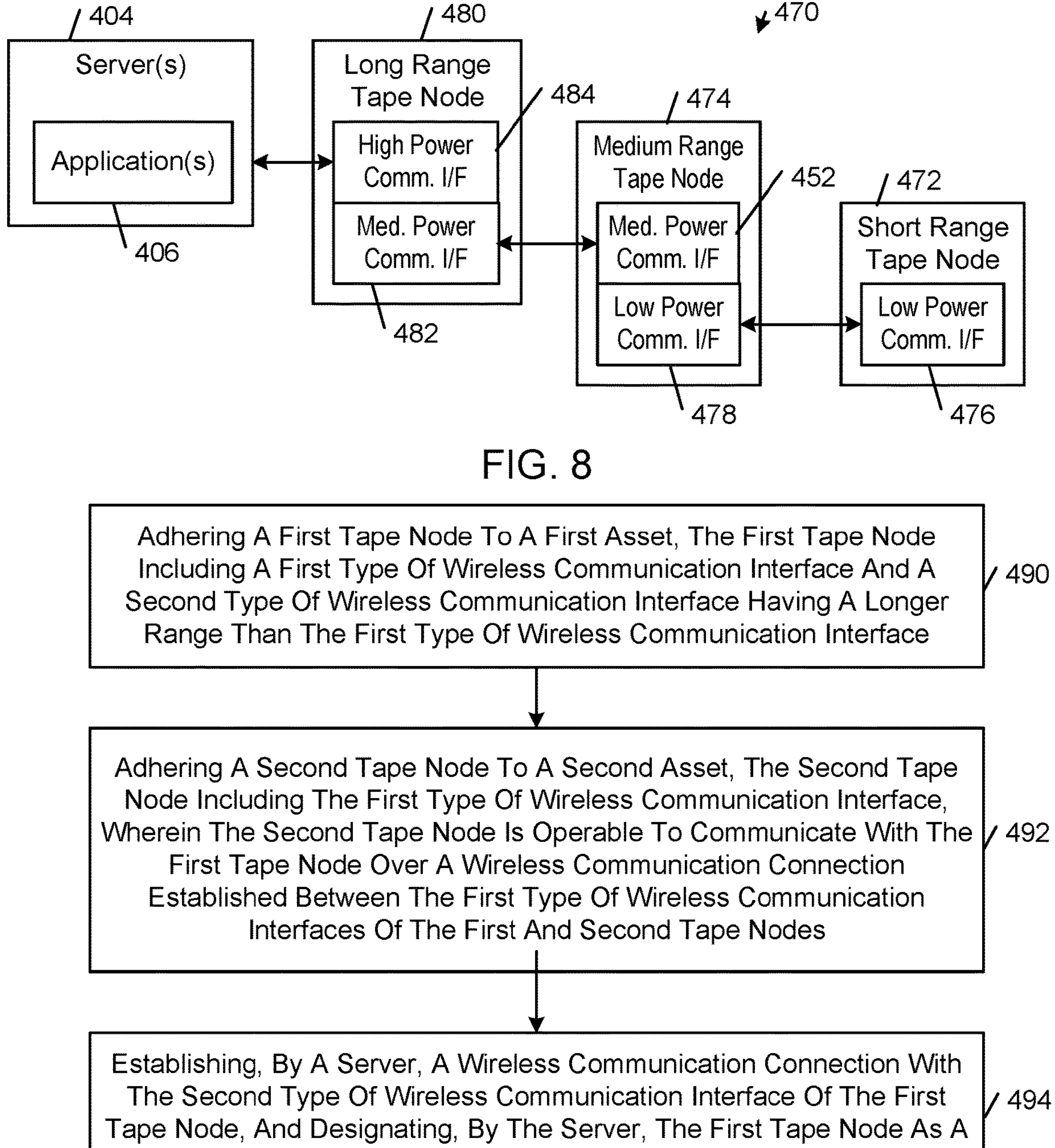
FIG. 8 is a diagrammatic view of a hierarchical communications network, according to some embodiments.
FIG. 9 is a flow diagram of a method of creating a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
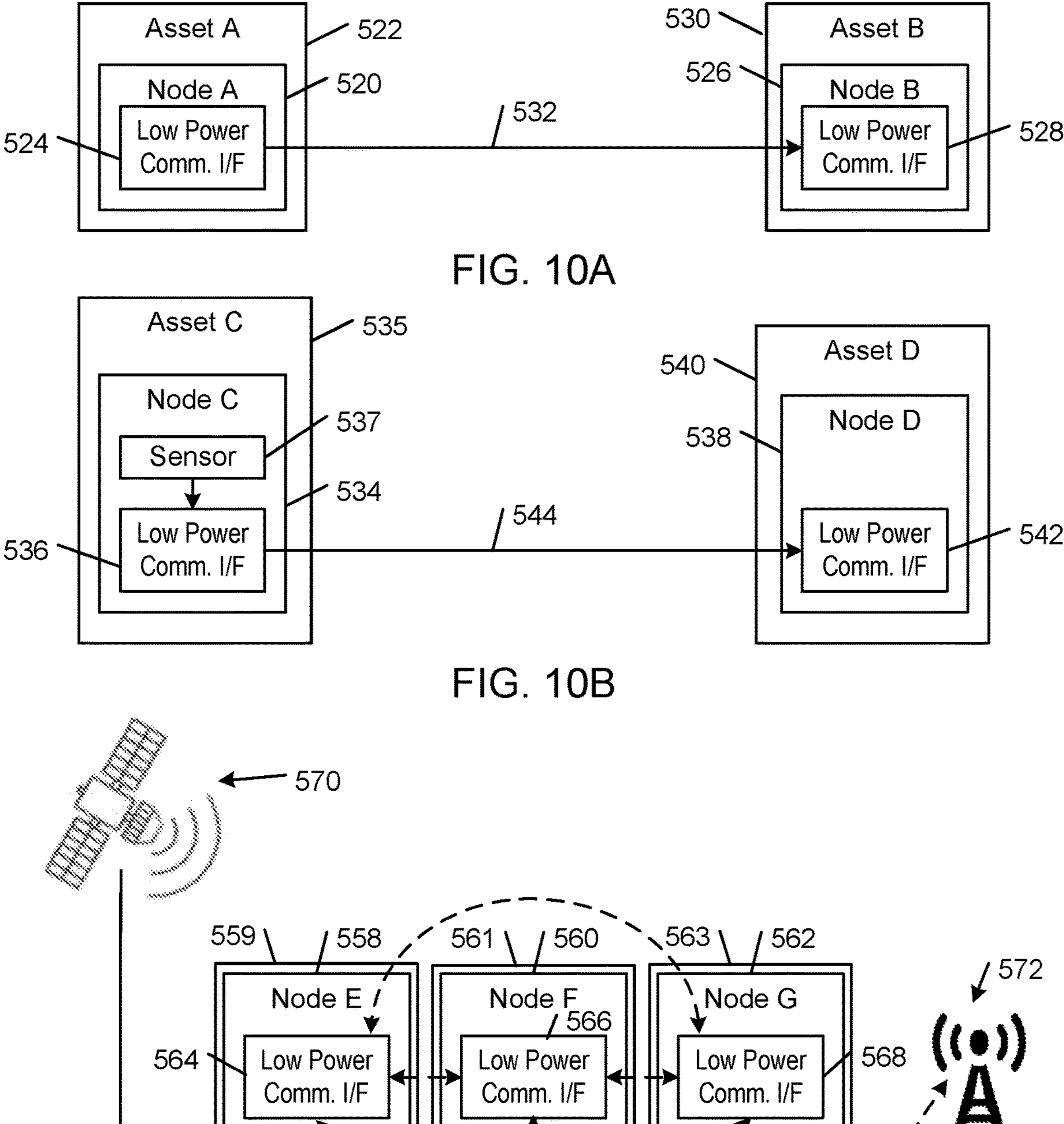

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
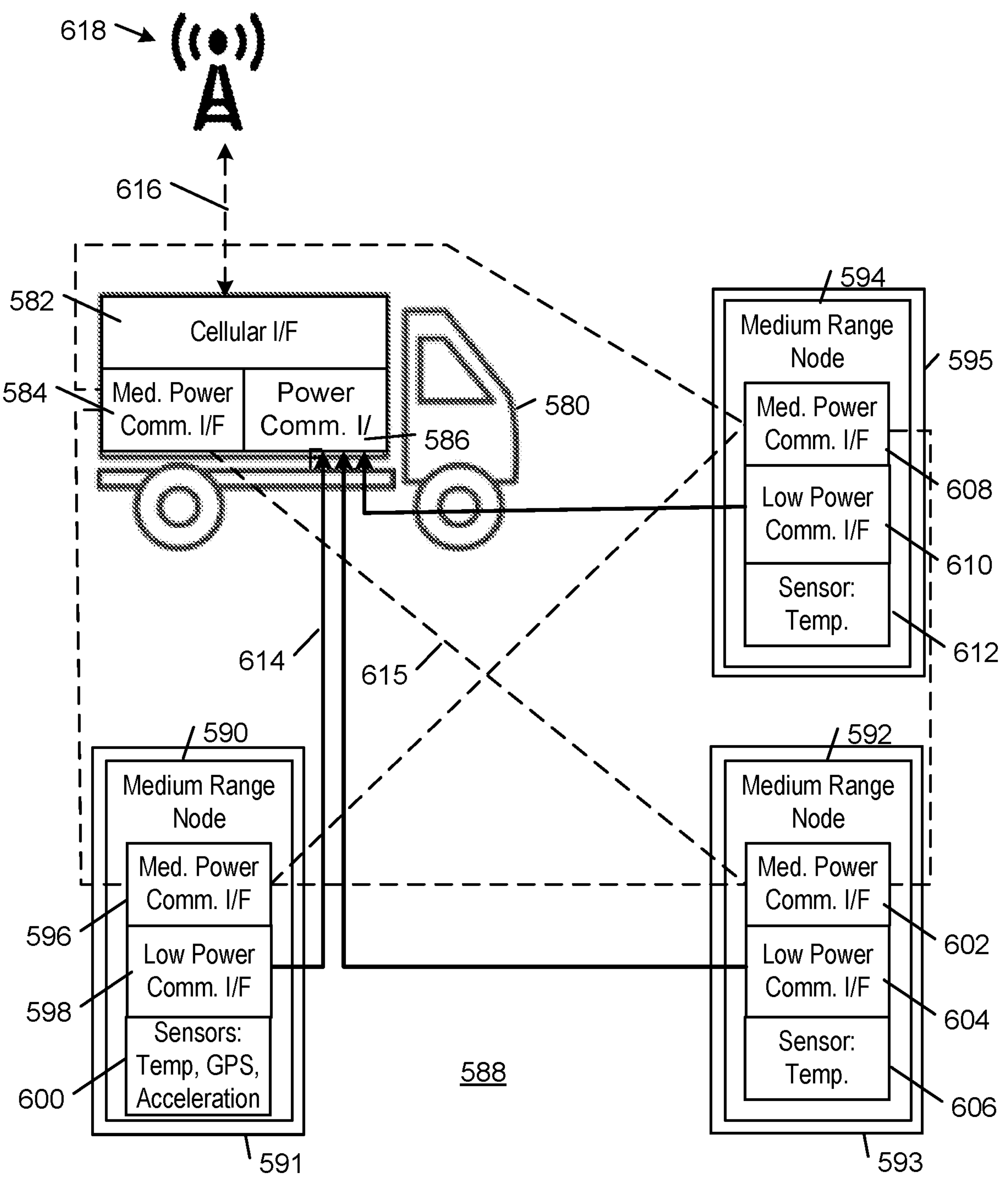

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
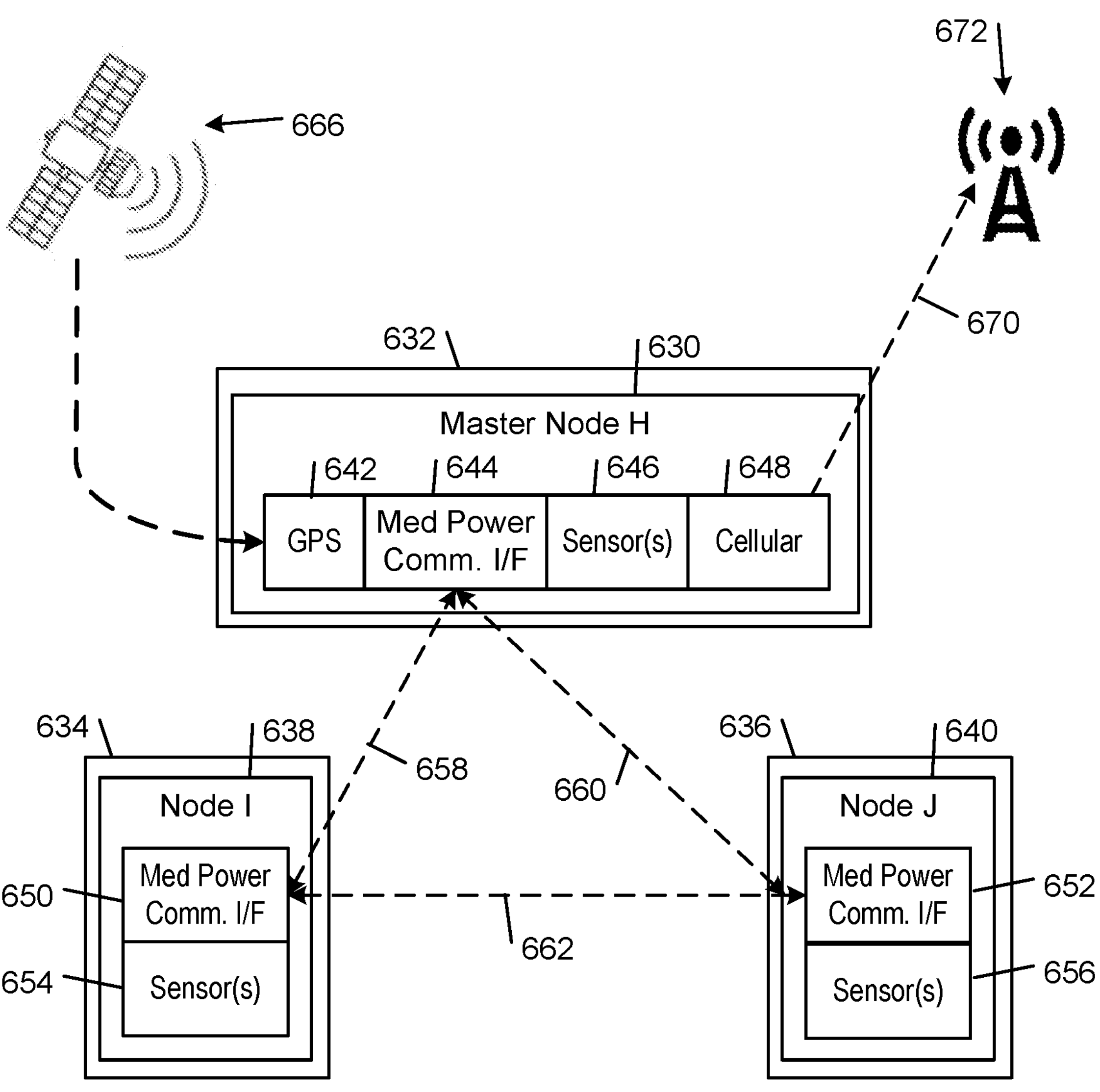

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Monitoring Groups of Assets and Detecting Rule Violations

Figure 11A:
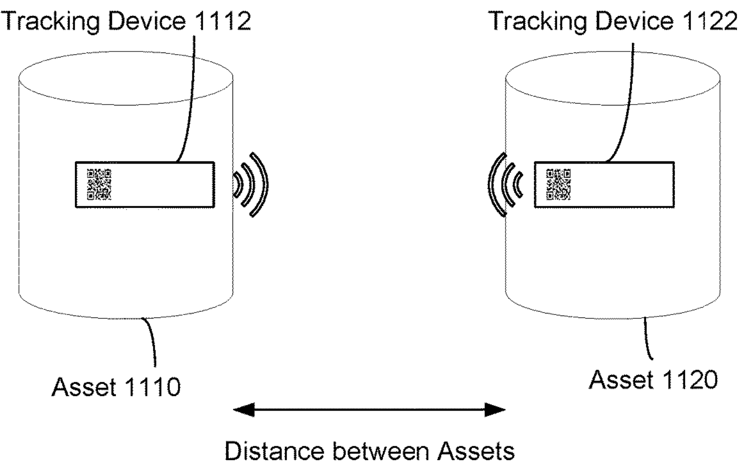
FIGS. 11A-11C show various examples of tracking devices being used to detect a violation of a rule for a groups of assets, according to some embodiments.
Figure 11B:
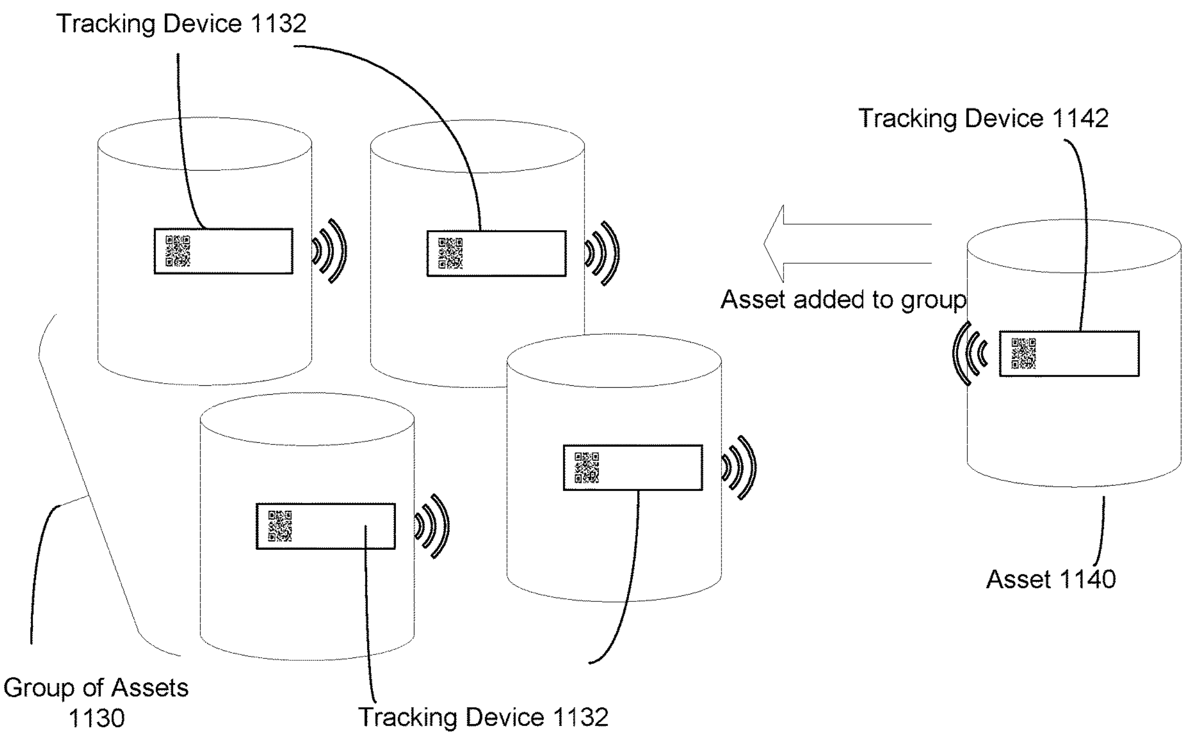
Figure 11C:
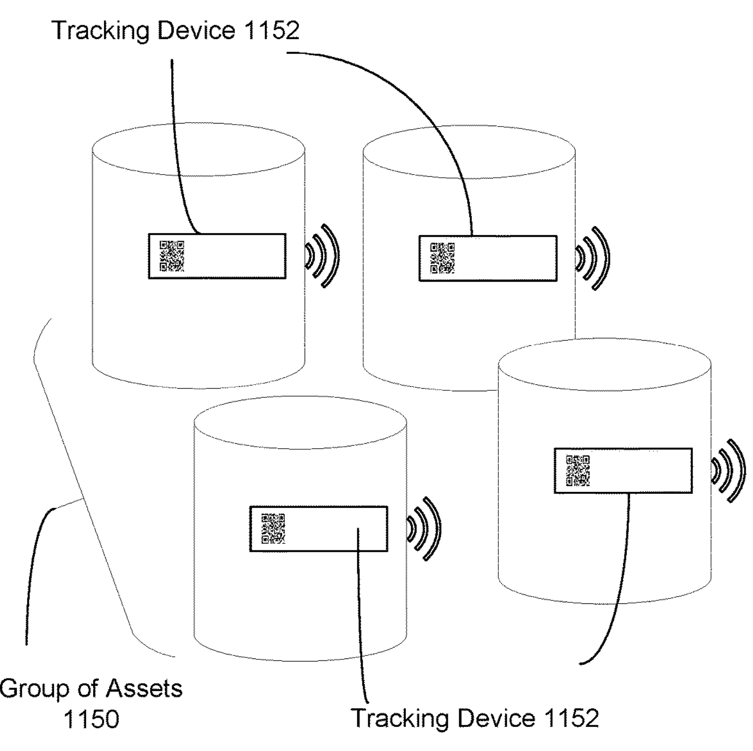
Figure 11C:

FIGS. 11A-11C show various examples of tracking devices being used to detect a violation of a rule for a groups of assets, according to some embodiments. Tracking device (also referred to herein as a "wireless tracking device) as discussed herein and in the drawings may be an embodiment of an adhesive tape platform, but it is not limited thereto.

In the example of FIG. 11A, an asset 1110 is being monitored by a tracking device 1112 that is attached to the asset 1112. Another asset 1120 is being monitored by a tracking device 1122. The tracking devices 1112, 1122 are associated with the tracking system 400 and are configured to wirelessly communicate with each other using a shared type of wireless communication system onboard the tracking devices 1112, 1122. In some embodiments, the tracking devices 1112, 1122 determine their distance from each other by wirelessly communicating and calculating an estimated distance based on received signal strength of the wireless communications (e.g., RSSI).

In some embodiments, the assets 1110, 1122 belong to the same group and rules for the group, as set by users of the tracking system, stipulate that the assets of the same group stay within a threshold distance from each other. In other embodiments, the tracking devices 1110, 1122 determine that any assets that are within a threshold distance from each other are part of a same group and track which assets are in the group. This is shown in FIG. 11B, where the tracking devices 1132, each attached and associated with an individual asset of the group 1130, detects that a new asset 1140 has been added to the group based on detecting that the asset 1140 and its tracking device 1142 is within a threshold distance from the assets in the group 1130. Each tracking device stores a manifest of asset identifiers and/or tracking device identifiers for assets it is currently grouped with. In some embodiments, each tracking device additionally stores identifiers for the type of asset corresponding to each asset in the group as well as rules for the asset that the tracking device is associated with. Each of the tracking devices, including the added tracking device 1142, communicates with the other tracking devices in the new group to update each other's group manifests. The tracking system 400 determines if the new group violates any rules for groups of assets. For example, in some environments assets of type A may not be mixed with assets of type B, according to one of the rules tracked by the tracking system 400. Thus, adding the asset 1140 to the group 1130 violates the rules for tracked assets, and the tracking system 400 issues an alert to a user client device or another node of the tracking system 400 in response to determining that a rule violation has occurred.

In some embodiments, the detection of rule violations is performed by the tracking devices 1132 and 1140. In this case, each tracking device store the rules corresponding to its associated asset, and continuously or periodically check for violations of the rules based on at least one of wireless communications with other wireless nodes of the tracking system 400 or sensor data captured by a sensor of the tracking device. A tracking device that detects a rule violation may wirelessly transmit an alert to any nearby wireless nodes of the tracking system 400. For example, the tracking device may wirelessly transmit the alert to a nearby client device, as shown in 17A, or it may transmit the alert to a nearby gateway device, as shown in FIG. 11C. The alert may additionally be relayed to a server of the tracking system 400. In other embodiments, a tracking device may include wireless communication systems for longer range communications (e.g., cellular communications, WiFi, Satellite Communications, or other communication systems) and transmits the alert to a server of the tracking system 400.

In the example of FIG. 11C, a group of assets 1150 tracked by tracking devices 1152 are within communication range of a gateway or infrastructure device 1160 associated with the tracking system 400. The tracking devices 1152 may determine their own location, report on their status, report on the group of assets 1150, and report alerts to the gateway device 1160, using wireless communications with the gateway 1160. In some embodiments, the violation of a rule for a group 1150 of assets may be detected by the gateway device 1160. In this case, the gateway 1160 stores the rules for the group of assets 1150 and the manifest of asset identifiers 1150 and type of assets for the group 1150. When the gateway 1160 detects a violation of the rules for the group 1150, the gateway 1160 transmits an alert to other nodes of the tracking system 400. If the gateway 1160 has internet connectivity or long range communication systems, the gateway 1160 may directly transmit the alert to the server of the tracking system 400.

In certain embodiments, the gateway device 1160 is associated with and located in an environment 1161. The environment itself may have rules associated with it and also associated with the assets 1150. For example, a volume rule may stipulate that the number or volume of assets of a certain type stored in the environment should not exceed a threshold amount. In this case, each of the tracking devices 1152 may store data on their respective assets including the amount or volume of the asset, as well as the type of asset. The tracking devices 1152 wirelessly transmit this data to the gateway device 1160, and the gateway device determines if the rule has been violated based on the data received from the tracking devices 1152. For example, each asset of the group of assets 1150 may be a barrel of a standard size containing a material of type C, and a rule stipulates that 3 or less barrels storing material of type C should be located in the environment 1161 at all times. Since there are 4 barrels storing the material, the scenario depicted in FIG. 11C is in violation of the rule. Each of the tracking devices reports data to the gateway device 1160 over wireless communication, the data including the type of material stored in the barrels of the group of assets 1150. The gateway device 1160 detects that there are 4 barrels of material type C in the environment 1161 based on the data received from the tracking devices 1152 and determines that the rule is being violated, in response. The gateway device 1160 then transmits an alert to the tracking system 400 corresponding to the rule violation.

Figures 12A, 12B:
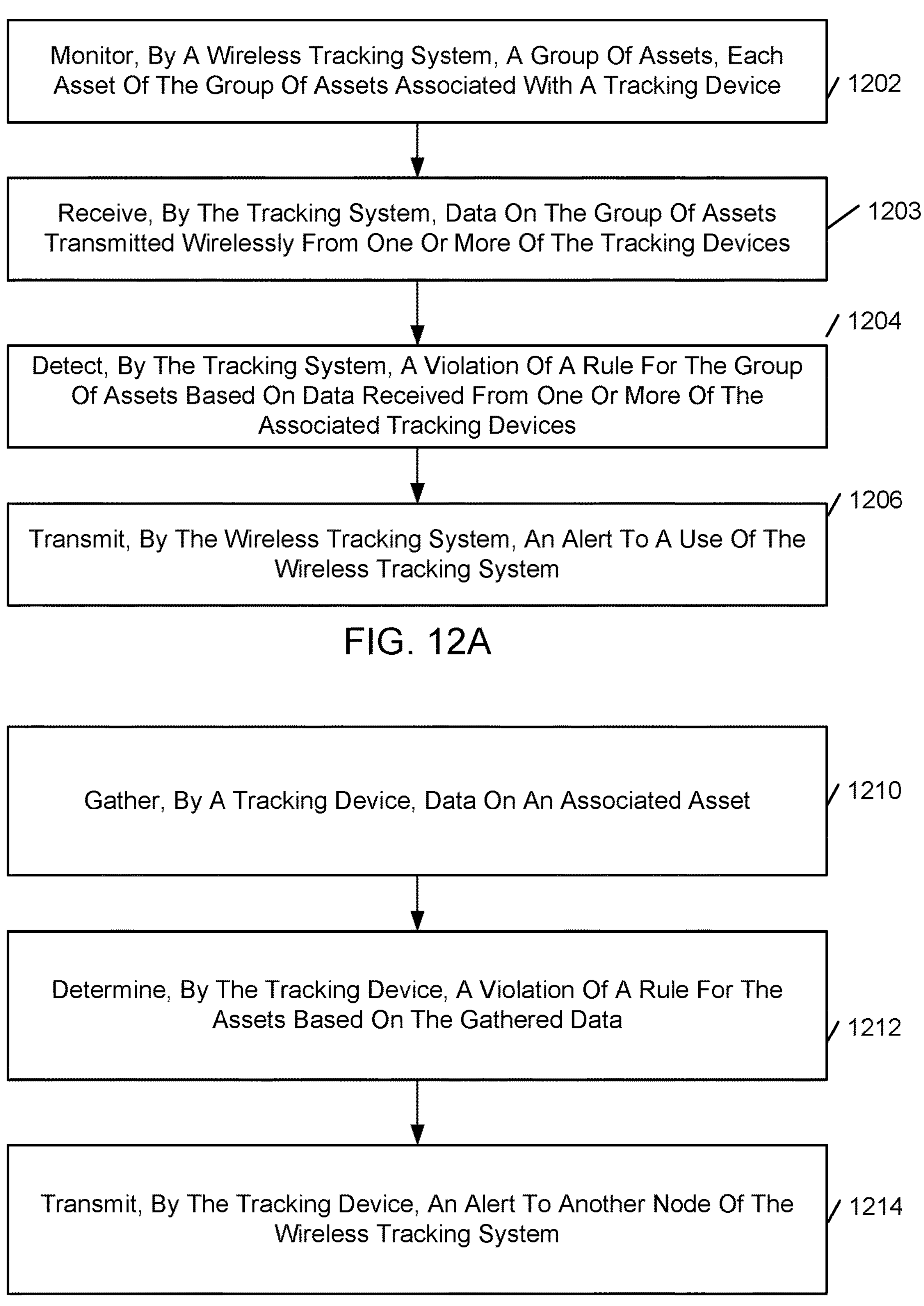
FIGS. 12A-12C are example flowcharts for methods of detecting a violation of a rule for a group of assets, according to some embodiments.
Figure 12C:
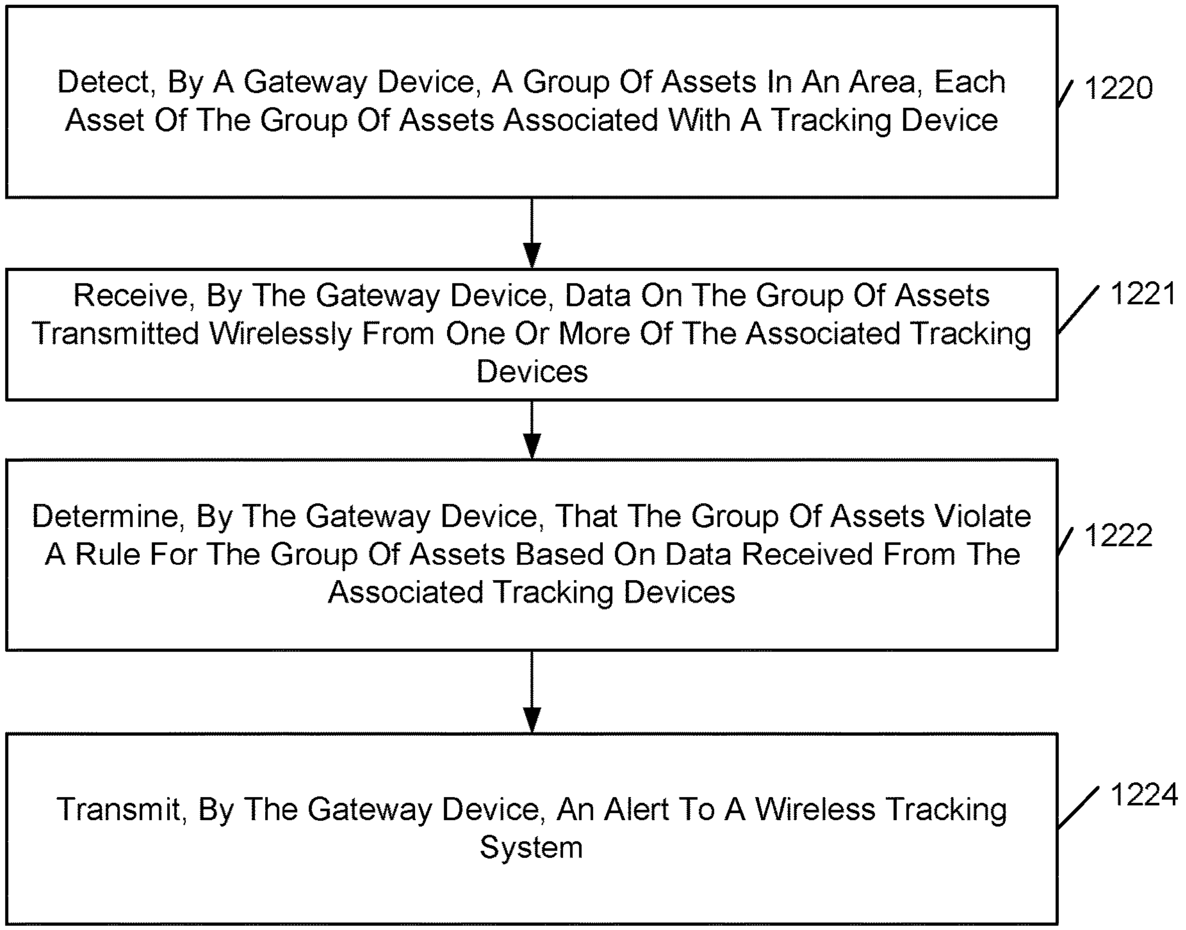

FIGS. 12A-12C are example flowcharts for methods of detecting a violation of a rule for a group of assets, according to some embodiments.

FIG. 12A is a flowchart for a method for detecting, by a tracking system, rule violations for a group of assets, according to some embodiments. The method includes monitoring 1202, by a wireless tracking system, a group of assets, each asset of the group of assets associated with a tracking device. The wireless tracking system receives 1203 data on the group of assets transmitted wirelessly from the tracking devices. The wireless tracking system detects 1204, a violation of a rule for the group of assets based on the data received from one or more of the associated tracking devices. In response, the wireless tracking system transmits 1206 an alert to a user of the wireless tracking system FIG. 12B is a flowchart for a method for a tracking device attached to an asset and monitoring the asset to detect a violation of a rule for the asset, according to some embodiments. The method includes gathering 1210, by the tracking device, data on the associated asset. The tracking device determine 1212, a violation of a rule for the assets has occurred based on the gathered data. In response, the tracking device transmits 1214, an alert to another node of the wireless tracking system 400.

FIG. 12C is a flowchart for a method for a gateway device in communication with a group of tracking devices to detect a violation of a rule for the group of assets. The gateway device detects 1220, a group of assets in an area, each asset of the group of assets associated with a tracking device. The gateway device detects 1220 each asset based on wireless communications with one or more of the associated tracking devices. The gateway device receives 1221 data on the group of assets transmitted wirelessly from one or more of the associated tracking devices. In some embodiments, the tracking devices are each attached to the asset they are associated with and monitoring. The gateway device determines 1222 that the group of assets violate a rule for the group of assets based on data received from the one or more associated tracking devices. In response, the gateway device transmits an alert to the wireless tracking system 400.

Figure 13A:
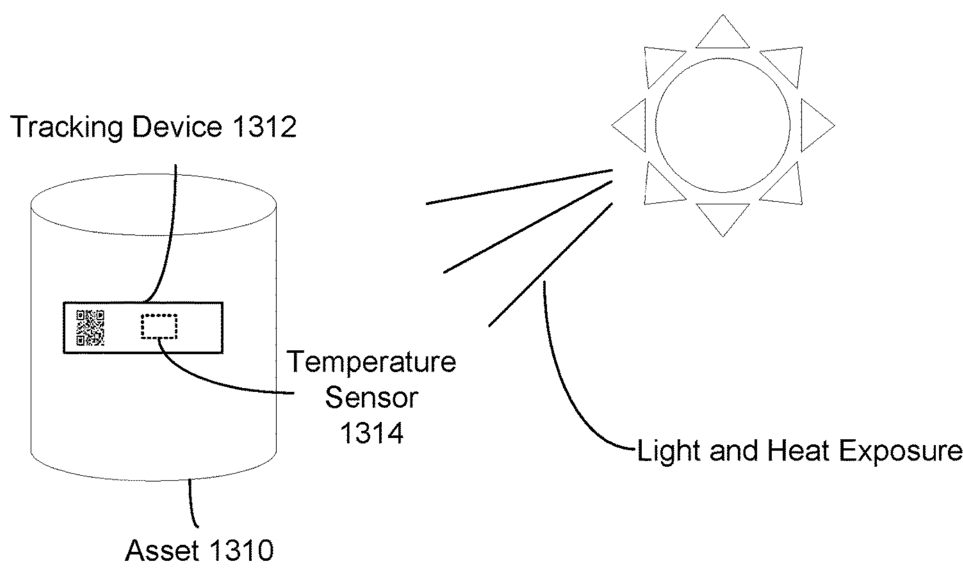
FIG. 13A-13D show an example of tracking devices being used to detect a violation of a rule for an asset or a group of assets based on environmental conditions of the asset or the group of assets, according to some embodiments.
Figure 13B:
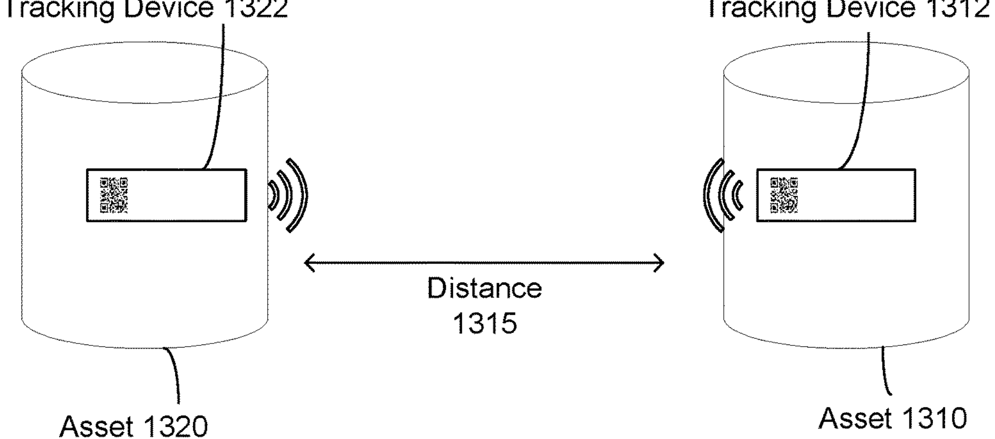

FIG. 13A-13B show an example of tracking devices being used to detect a violation of a rule for an asset or a group of assets based on environmental conditions of the asset or the group of assets, according to some embodiments. The environmental conditions are determined based on one or more of sensor data captured by sensors of the tracking devices, wireless communications from other nodes of the wireless tracking system 400, and data received by the tracking devices.

In the example of FIG. 13A, a sensor on a tracking device 1312 is used to detect conditions on an asset 1310 and/or the environment of the asset 1310. In FIG. 13A a temperature sensor is shown, but in other embodiments, other sensors may be used to determine the conditions.

For example, the sensor used by the tracking device 1312 may be a vibration sensor, a temperature sensor, a heat sensor, an accelerometer, a motion sensor, a light sensor, a chemical sensor, a magnetometer, an electromagnetic field sensor, a capacitive sensor, a resistive touch sensor, an electrical impedance sensor, an electrical current sensor, a moisture sensor, a pressure sensor, some other type of sensor, or some combination thereof. The tracking device 1312 may include a plurality of sensors, in some embodiments.

A rule for the asset 1310 includes rules stipulating that the asset 1310 should not be exposed to high heat or high temperatures. The rule may be based on safety conditions or workplace standards, for example. In an example, a parameter of the rule includes the tracking device detecting temperatures below or equal to a first threshold temperature. When the tracking device 1312 detects temperature data from the temperature sensor 1314 that is above the first threshold temperature, the tracking device 1312 may wirelessly transmit an alert to other wireless nodes of the tracking system 400 or report the data or a compressed version of the data to a nearby gateway device, as in the example of FIG. 11C. In further embodiments, if the tracking device 1312 detects temperatures above a second threshold temperature, the tracking device stores the event in its memory and also transmits alerts to other wireless nodes of the tracking system 400. In response to the event, the tracking device may report to other wireless nodes of the tracking system 400 that the asset 1310 is compromised and must be disposed of or otherwise handled, whenever the tracking device 1312 communicates with another wireless node of the tracking system 400.

In some embodiments, a group of tracking devices collaborate to determine violation of rules for assets. For example, each of the tracking devices 1132 associated with the group of assets in the example of FIG. 11B may include a temperature sensor. The tracking devices may wirelessly communicate with each other to determine statistics, aggregate data for the group of assets, and perform calculations on captured sensor data for determining the occurrence of rule violations. In some embodiments, if one tracking device of the group of tracking devices 1132 detects a rule violation for an asset in the group 1130, the one tracking device transmits alerts to the other tracking devices. In response to receiving the alert, the other tracking devices run protocols to determine if the other assets are also experiencing rule violations. For example, if one of the assets is detected having a temperature over the first threshold temperature, the tracking device for the one asset alerts the other tracking devices associated with the group 1130. In response to receiving the alerts, the other tracking devices then capture sensor data (e.g., temperature data) to determine if the other assets in the group 1130 are also experiencing high temperatures.

In other embodiments, upon detecting a first event that may potentially indicate that a rule violation has occurred for an asset, a tracking device for an asset in the group 1150 (shown in FIG. 11C) transmits an alert to other wireless tracking devices for assets in the group 1150 or other wireless nodes in the environment of the asset (e.g., gateway device 1160). In the present example, one or more of the tracking devices 1152 include sensors for capturing conditions of respective assets. The other wireless tracking devices than gather data (sensor data and other data) and communicate the data to the tracking device or to the gateway device 1160. As a group, the tracking devices and optionally the gateway device 1160 determines if the rule has been violated based on the data that triggered the initial detection of the first event, in addition to the data aggregated from the other wireless tracking devices.

FIG. 13B shows an example of an asset of type A 1310 and an asset of type B 1320. In this example, a rule for the assets 1310, 1320 stipulates that assets of type A and type B should not be mixed in groups. If a tracking device 1312 monitoring an asset 1310 of type A detects that the asset is in a group with an asset 1320 of type B, based on wireless communications with the tracking device 1322, the tracking device 1312 determines that the rule has been violated and transmits alerts to other wireless nodes of the rule violation. The tracking device 1322 may similarly determine the rule violation.

In other embodiments, the rule stipulates that assets of type A may not be within a threshold distance of assets of type B. In the example of FIG. 13B, the asset 1310 is within a distance 1315 from asset 1320 that is less than the threshold distance. The tracking devices 1322 and 1312 an estimate of the distance between the two assets 1310, 1312 based on wireless communications between the tracking devices 1322, 1312 (e.g., using RSSI or other methods). The tracking devices determine that the estimated distance is below the threshold distance and that the rule is being violated. At least on of the tracking devices then transmits an alert corresponding to the rule violation to another wireless node of the tracking system 400.

Figure 13C:
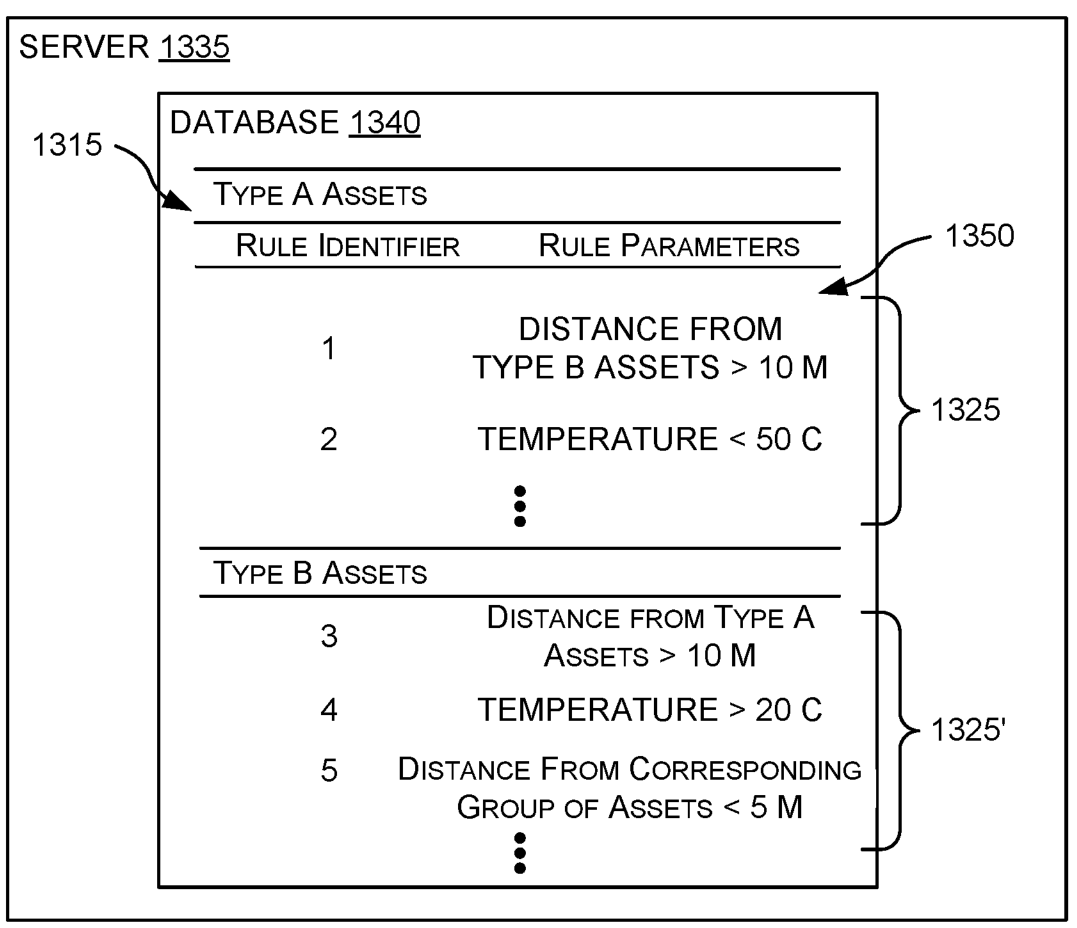

FIG. 13C shows a portion of a database 1340 stored or hosted on a server 1335 of the tracking system 400 which stores the rules for a plurality of types 1315 of assets being tracked by the tracking system 400. The database is maintained and updated by the server of the tracking system 400, and the set of rules corresponding to a type of asset as stored by the database may change over time. For example, a user may input updated rules and upload the updated rules to the server using a client device, which results in the server updating the rules stored in the database 1340.

The database 1340 stores rules corresponding to and associated with each of a plurality of types 1315 of assets. In the example shown in FIG. 13C, an excerpt of rules associated with a Type A of assets and a Type B of assets is shown, but the database is not limited to rules for only those two types of assets, according to embodiments. The rules 1325 are associated with assets of Type A, and the rules 1325' are associated with assets of Type B. Not all of the rules 1325 and 1325' are shown in FIG. 13C. The database stores a rule identifier and parameters for each rule, according to some embodiments. A different number and type of rules and parameters may be stored on the database than is shown in FIG. 13C. The database 1340 may also store and associate rules with specific assets being tracked by the tracking system 400, with the sets of rules associated with specific identifiers for the assets.

Figure 13D:
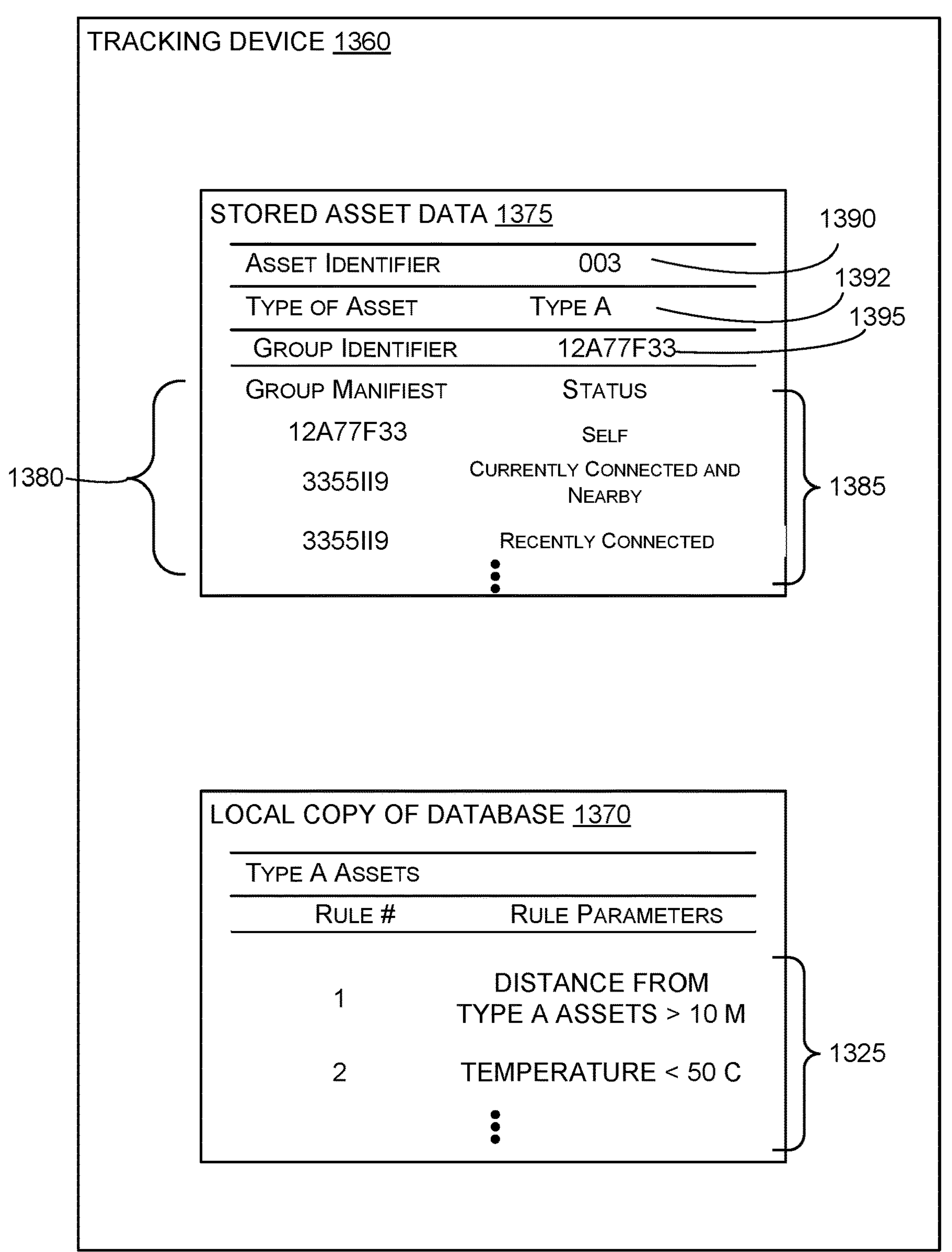

FIG. 13D shows a portion of data stored on a memory and/or storage of a tracking device 1360 monitoring an asset, according to some embodiments. The stored data includes data relevant to the asset 1375 and a local copy 1370 of a portion of the database 1340. The portion of the database 1370 copied from the database 1340 corresponds to the type of the asset 1392, Type A in the example of FIG. 13D, or corresponds to the asset identifier. The portion of the database 1370 copied on the memory or storage of the tracking device 1360 is used by the wireless tracking device to determine rule violations for the asset being monitored by the tracking device 1360. The portion of the database 1370 may be downloaded from the server 1335 and transmitted to the tracking device 1360 by another wireless node of the tracking system 400. For example, when initializing the tracking device 1360 for use in monitoring the asset, a user may download the portion of the database 1370 to a client device and transmit the downloaded portion to the tracking device 1360 using a wireless communication connection (e.g., over Bluetooth or BLE communications). Alternatively, the tracking device may receive the portion 1370 from a gateway device it is wirelessly communicating with.

The data on the asset 1375 includes an asset identifier 1390 for the monitored asset, a type of asset 1392 for the monitored asset, a group identifier 1395 for a group of assets that the asset currently belongs to, and a group manifest 1380 including the identifiers 1380 for members of the group and the current status 1385 for each member of the group as tracked by the tracking device 1360. The data shown in FIG. 13D may also be stored on gateway devices, client devices, and other devices associated with the tracking system 400. For example, the asset data 1375 may be transmitted from the tracking device 1360 to a gateway device that is communicating with the tracking device 1360, which stores the asset data 1375 on its local storage or memory. The local copy of the database 1370 may then be downloaded by the gateway device from the tracking device 1360 or from another source (e.g., the server 1335).

Figure 14:
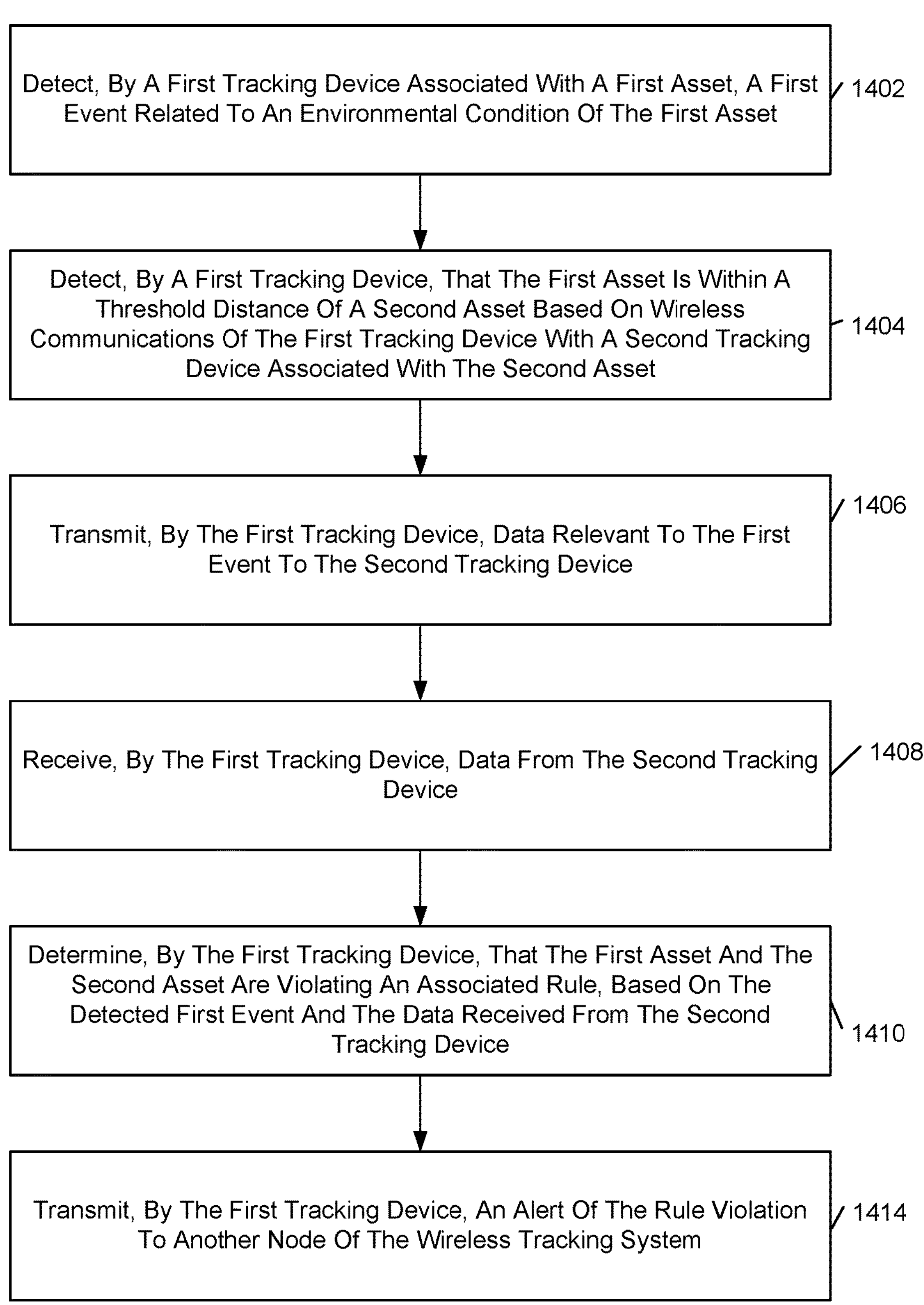
FIG. 14 is an example flowchart for a method of detecting a violation of a rule for an asset or a group of assets, according to some embodiments.

FIG. 14 is an example flowchart for a method of detecting a violation of a rule for an asset or a group of assets, according to some embodiments. The method includes detecting 1402, by a first tracking device associated with a first asset, a first event related to an environmental condition of the first asset. The first tracking device detects 1404 that the first asset is within a threshold distance of a second asset based on wireless communications of the first tracking device with a second tracking device associated with the second asset. The first tracking device transmits data 1406 relevant to the first event to the second tracking device. In response, the second tracking collects data, in response to receiving the data from the first tracking device. The collected data may include sensor data from sensors integrated with the second tracking device, data received from other wireless nodes of the tracking system, data stored on the memory or storage of the second tracking device, other types of data, or some combination thereof. For example, the first event may include the first asset being in a location outside of a first region. The first tracking device may then alert the second tracking device, the alert including a request for additional data. The additional data, in some embodiments, may include a location of the second asset, an estimated or precise location of the first asset, an identifier of the second tracking device, a type of asset for the second tracking device, a manifest of assets grouped with the second asset, available communication resources in the environment of the second tracking device, temperature data collected by a sensor of the second tracking device, other sensor data, other types of data, or some combination thereof.

The first tracking device then receives data from the second tracking device and determines that first asset and the second asset are violating an associated rule, based on the detected first event and the data received from the second tracking device. In response, the first tracking device transmits an alert of the rule violation to another node of the wireless tracking system. In some embodiments, the second tracking device also or alternatively transmits the alert to the other node of the wireless tracking system.

The other node of the wireless tracking system that the first tracking device transmits the alert to may be another tracking device, another tracking device including some communication systems that differ from the communication systems included on the tracking device, a gateway device, a client device (e.g., a computer or smartphone), other wireless nodes of the tracking system, or some combination thereof.

Figure 15:
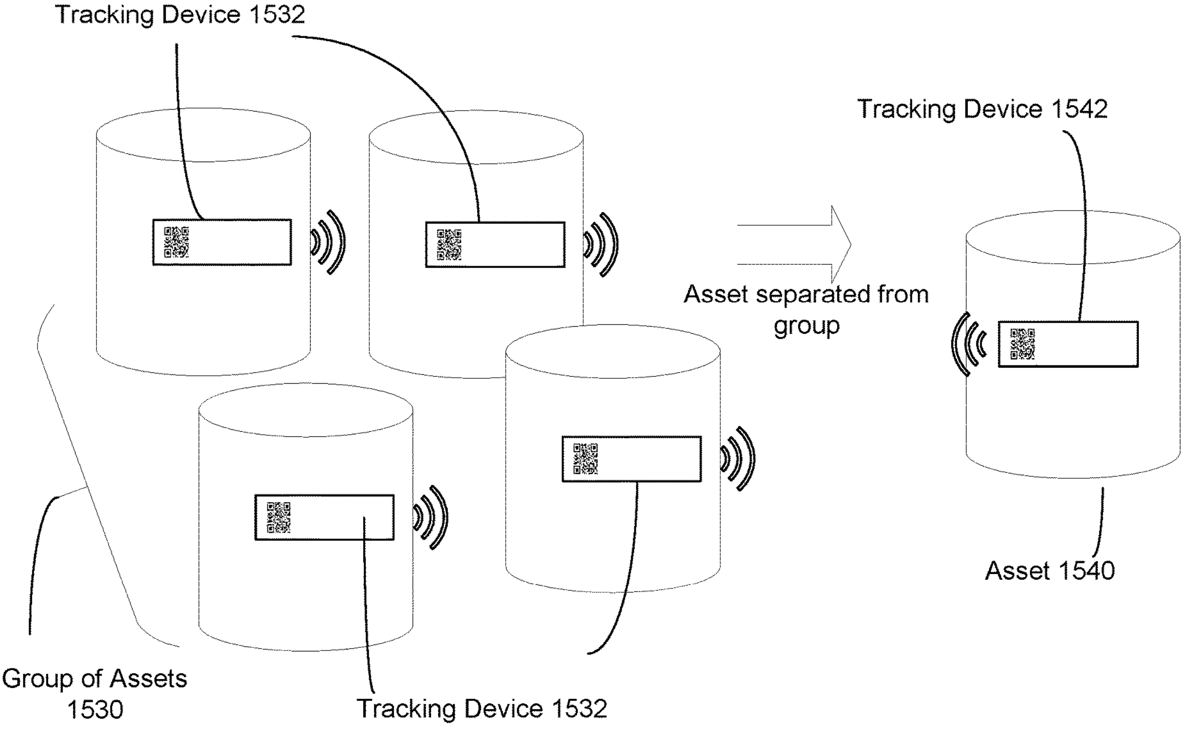
FIG. 15 is an example of tracking devices being used to detect a separation of assets in a group of assets that violates a rule for the group of assets, according to some embodiments.

FIG. 15 is an example of tracking devices being used to detect a separation of assets in a group of assets that violates a rule for the group of assets, according to some embodiments. In the example of FIG. 15, the group of assets 1530 including asset 1540, must stay grouped together in order to not violate the rule. When the asset 1540 is separated from the group of assets 1530, the tracking devices 1532 detect the separation event based on communications or lack of communications between the tracking device 1542 and the tracking devices 1532. For example, one or more of the tracking devices 1532 may detect that the asset 1540 is further than a threshold distance from the assets in the group 1530 based on RSSI. Similarly, the tracking device 1542 may determine that it has been separated based on communications with or a lack of communication with the tracking devices 1532.

Figure 16:
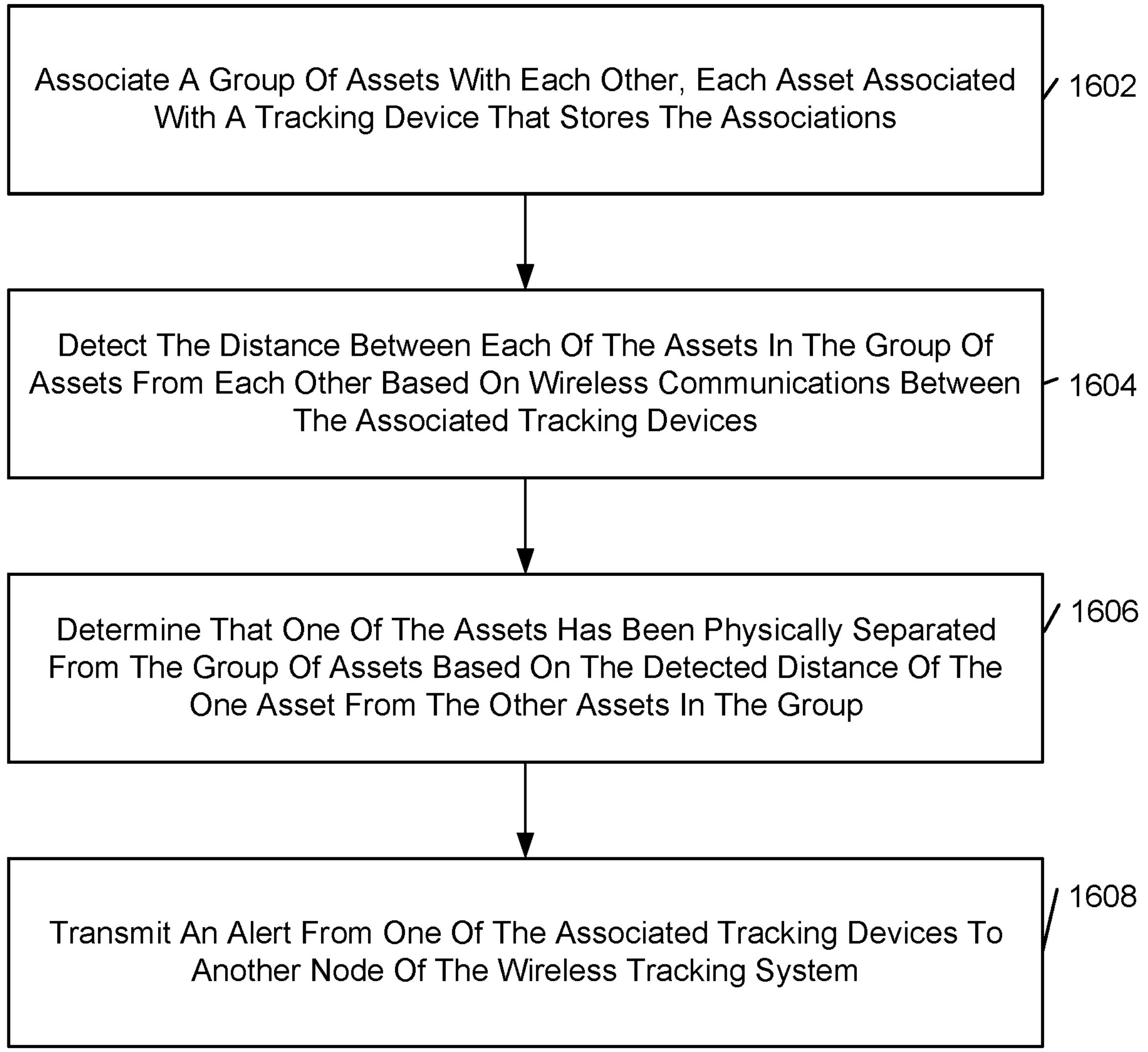
FIG. 16 is a flowchart for a method of detecting a separation of assets in a group of assets that violates a rule for the group of assets, according to some embodiments.

FIG. 16 is a flowchart for a method of detecting a separation of assets in a group of assets that violates a rule for the group of assets, according to some embodiments. The method includes associating 1602 a group of assets with each other, each asset also associated with a tracking device that stores the associations. The distance between each of the assets in the group of assets from each other is detected 1604 based on wireless communications between the associated tracking devices. It is determined 1606 that one of the assets has been physically separated from the group of assets based on the detected distance of the one asset from the other assets in the group. In response, an alert is transmitted 1608 from one of the associated tracking devices to another node of the wireless tracking system 400.

Autonomous Intervention for Assets Violating Rules

When an alert corresponding to a rule violation is received by a wireless node of the tracking system 400 from one of the tracking devices associated with an asset, the wireless node may determine the follow-up action based on programming and logic stored and executed on the wireless node. The follow-up action may include relaying the alert to other wireless nodes, until the alert reaches a server of the tracking system that includes a controller that manages the tracked assets. The server may then issue instructions to nodes of the wireless tracking system to intervene with the asset and resolve the rule violation. For example, the server may send a notification to a client device that displays the notification to a user via an associated app installed on the client device. The displayed notification may include instructions to the user on how to intervene with the asset.

Figure 17A:
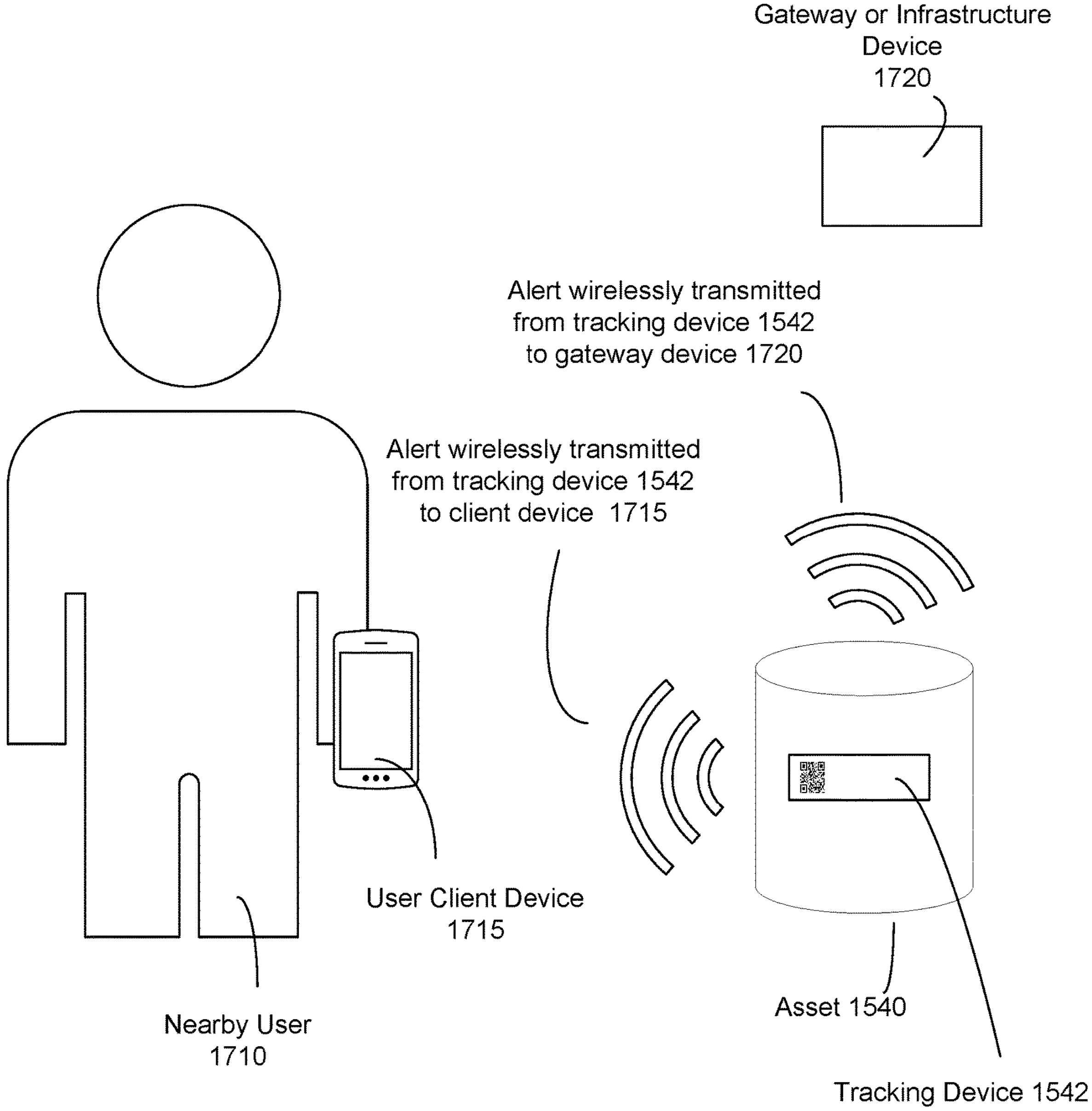
FIGS. 17A-17C are example diagrams showing a method for requesting intervention from a user of the tracking system, in response to a tracking device associated with an asset detecting a rule violation for the asset, according to some embodiments.
Figure 17B:
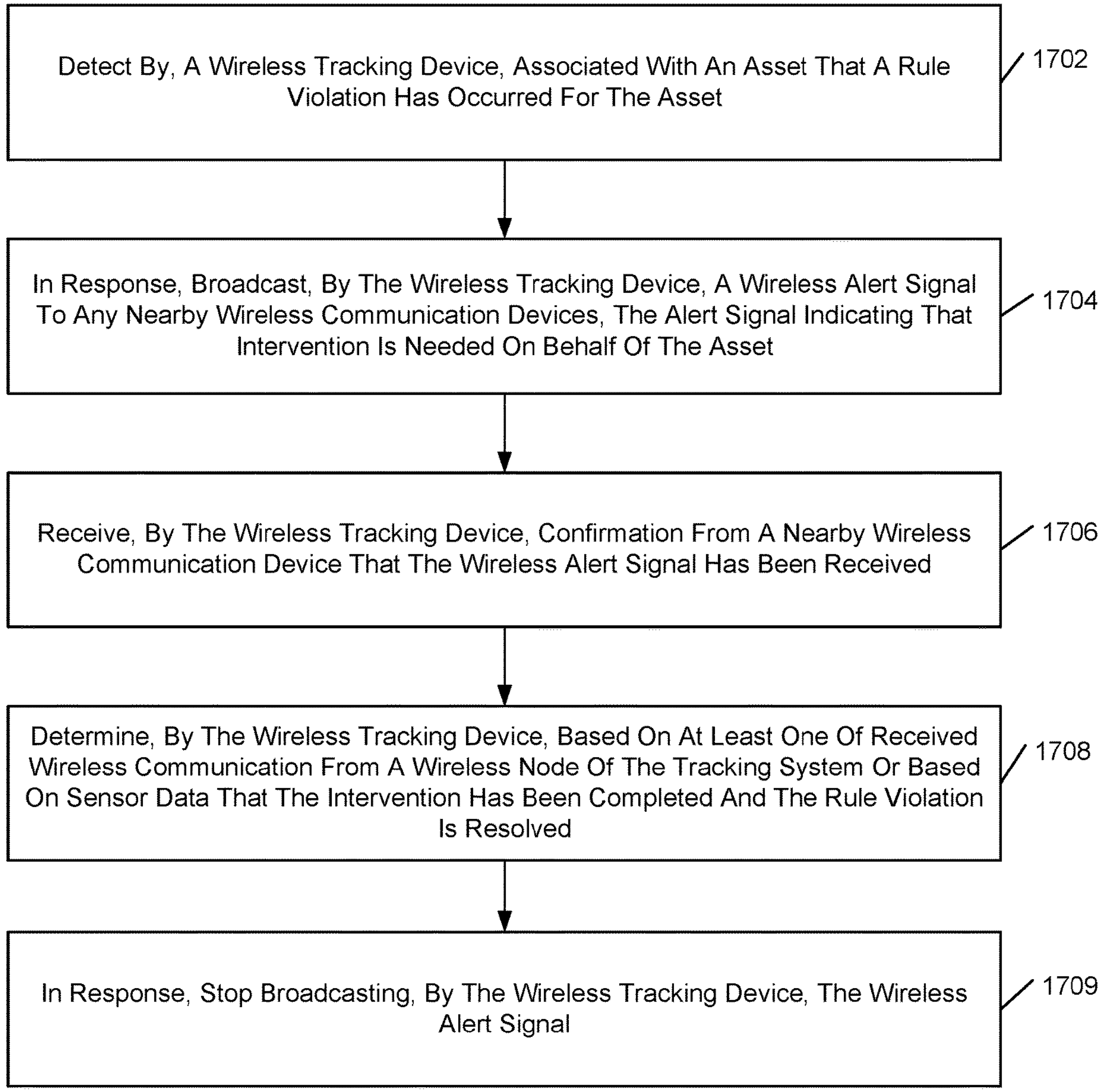
Figure 17C:
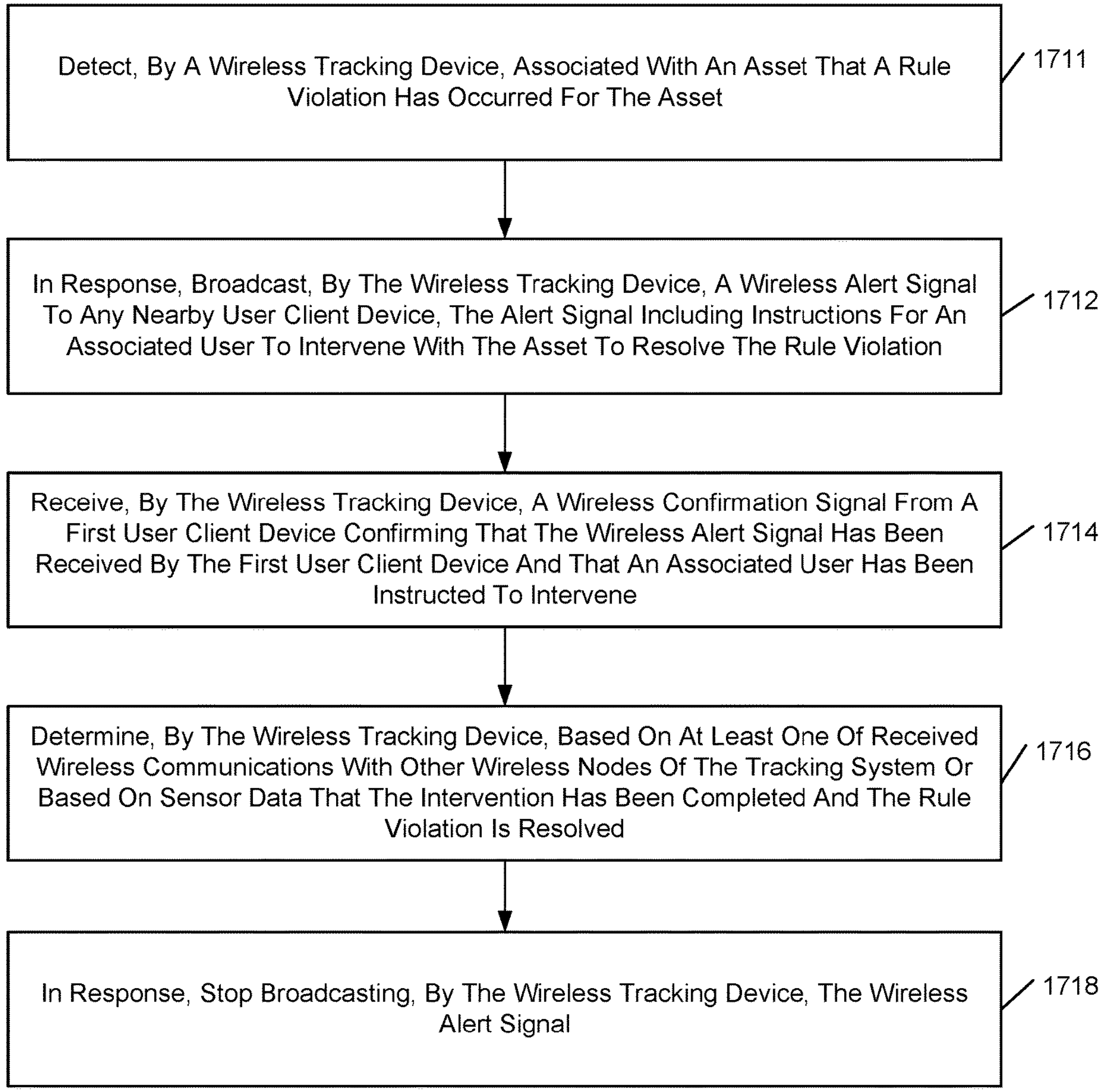

In some embodiments, the wireless node that receives the alert may determine that it may initiate the intervention locally without necessarily communicating with the server of the tracking system 400. The wireless node may then initiate the intervention by communicating instructions locally using short range or medium range communication systems and channels to other wireless nodes that are within communication range of the wireless node. FIGS. 17A-17C are example diagrams showing a method for requesting intervention from a user of the tracking system, in response to a tracking device associated with an asset detecting a rule violation for the asset, according to some embodiments. In the example of FIG. 17A, the asset 1540 and the tracking device 1542 from FIG. 15 have been separated from a group and are now in violation of a rule stipulating that the asset 1542 stay within a vicinity of the group. The tracking device 1542 determines a rule violation has occurred for the asset 1540 and, in response, the tracking device 1542 may directly communicate an alert to the user client device 1715 of a nearby user 1710 or communicate an alert to the gateway or infrastructure device 1720 nearby. In embodiments where the gateway device receives the alert, the gateway device 1720 may follow-up by instructing the user 1710 via transmission to the client device to intervene with the asset. In other embodiments, the client device receives the alert directly from the tracking device 1542 over wireless communication and displays a notification to the user 1710 instructing the user 1710 to intervene with the asset 1540.

FIG. 17B is a method for autonomously requesting intervention of an asset from a nearby wireless communication device, in response to detecting a rule violation for the asset, according to some embodiments. The nearby wireless communication device may be a user's client device, in some embodiments. The method includes detecting 1702, by a wireless tracking device associated with an asset, that a rule violation has occurred for the asset. In response, the wireless tracking device continuously or periodically broadcasts 1704 a wireless alert signal to any nearby wireless communication device or devices, the alert signal indicating that intervention is needed on behalf of the asset. The wireless tracking device then receives 1706 a confirmation signal from a nearby wireless communication device confirming that the wireless alert signal has been received by a wireless node of the tracking system 400. In further embodiments, the confirmation may also indicate that an associated user has been instructed to intervene. The wireless tracking device determines 1708, based on at least one of the received wireless communications with other wireless nodes of the tracking system or based at least on sensor data that the intervention has been completed and the rule violation is resolved. In response, the wireless tracking device stops broadcasting 1709 the wireless alert signal.

FIG. 17C is a method for autonomously requesting intervention of an asset from a nearby wireless communication device, in response to detecting a rule violation for the asset, according to some embodiments. The nearby wireless communication device may be a user's client device, in some embodiments. The method includes detecting 1711, by a wireless tracking device, associated with an asset that a rule violation has occurred for the asset. In response the wireless tracking device continuously or periodically broadcasts 1712 a wireless alert signal to any nearby user client device, the alert signal including instructions for an associated user to intervene with the asset to resolve the rule violation. The wireless tracking device then receives 1714 a wireless confirmation signal from a first user client device confirming that the wireless alert signal has been received by the first user client device and that an associated user has been instructed to intervene. The wireless tracking device determines 1716, based on at least one of received wireless communications with other wireless nodes of the tracking system or based on sensor data, that the intervention has been completed and the rule violation is resolved. In response, the wireless tracking device stops broadcasting 1718 the wireless alert signal.

Computer Apparatus

Figure 18:
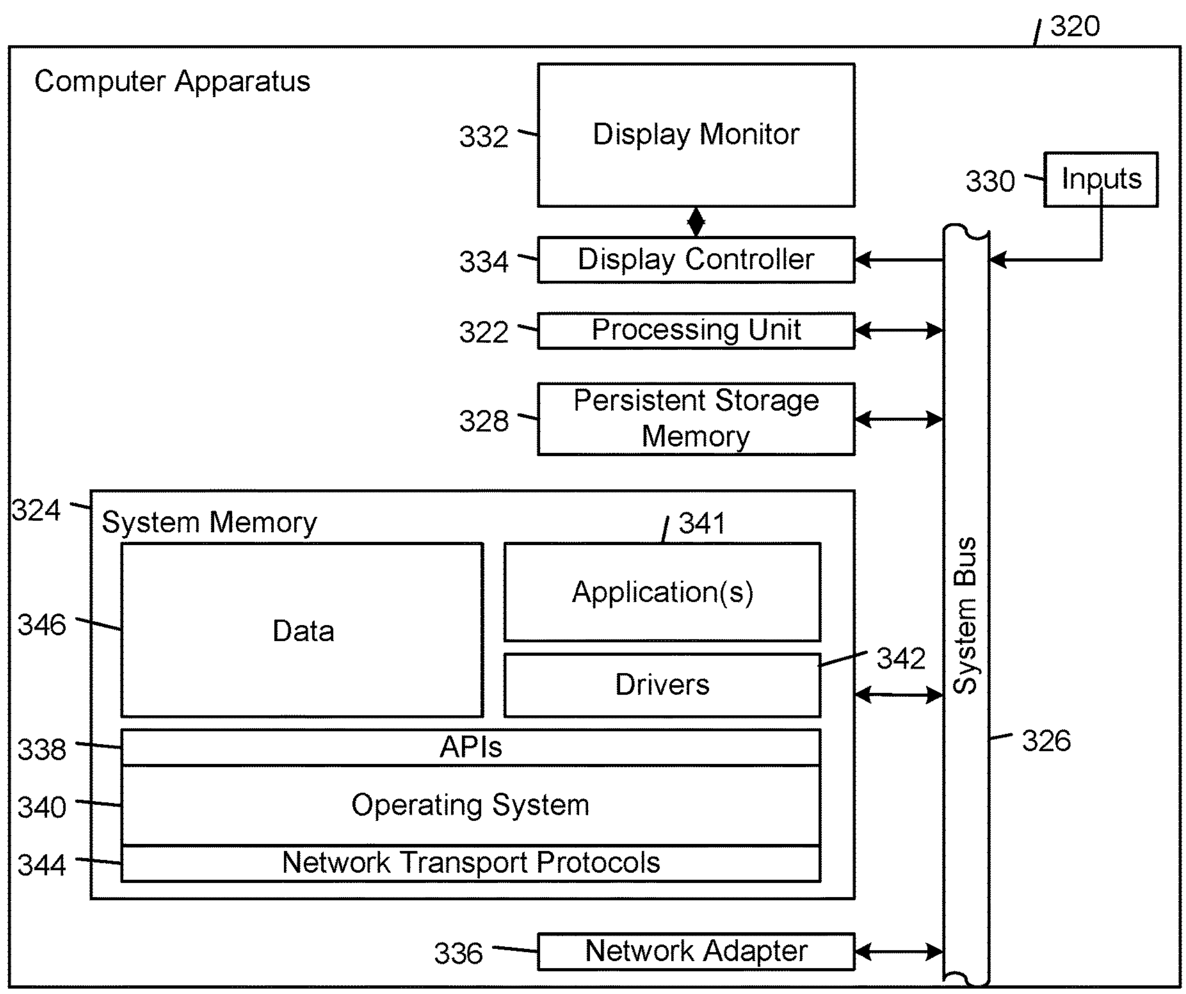
FIG. 18 shows an example embodiment of computer apparatus, according to some embodiments.

FIG. 18 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

ADDITIONAL EMBODIMENTS

There's certain materials that cannot be mixed together in the same truck, vehicle, space, or area. For example, garlic and strawberries should not be stored or transported together. More importantly, certain pharmaceuticals cannot be mixed with each other or with other chemicals. Inappropriate mixing of assets or materials can create hazardous conditions or violate instituted regulations.

Can track mixing of materials or assets using tracking devices (e.g., tape nodes): Place tracking devices on containers with these materials or assets. Tracking devices can detect if inappropriate mixing has occurred, or if a material or asset itself is intrinsically hazardous.

If inappropriate or unapproved mixing occurs, tracking system detects the mixing event based on tape nodes for the mixed assets being in proximity to each other. Tracking system triggers an alarm. The alarm may transmit notifications to users using the network (e.g., e-mail, phone call, SMS message, other electronic alert). In some embodiments, a physical alarm is triggered. For example, a trailer or truck transporting the assets may have an alarm system that is triggered (e.g., audio alarm, remote notification, light flashing, etc.).

Tracking devices can detect other rule violations for groups of assets. For example, if assets should remain within a threshold distance of each other at all times, the tracking devices are configured to detect the assets being separated from each other. In other cases, each of the assets in the group of assets may have tolerable environmental condition. If an excursion from the tolerable levels occur, the tracking devices detect it and transmits alerts to other nodes in the tracking system. For example, the group of assets may have a rule where each asset must remain within a temperature range.

Tracking system can remotely issue notifications and trigger further actions

Tracking system can notify somebody to prevent truck containing improperly mixed assets from leaving facility.

Tracking system can notify somebody to separate assets that are improperly mixed Tracking system can notify somebody to locate an asset that should not have been separated from the group of assets Tracking system can instruct an assembly system or conveyor belt system to divert a group of assets E.g., if one or more assets violates a rule, the one or more assets are removed from a main path of the assembly system or conveyor belt system Tracking system can instruct a tracking device on an asset that violates a rule to broadcast an alert notifying any other wireless devices or nodes in communication with the tracking device of the violation Tape node/gateway node on gate—if truck has assets or materials that are improperly mixed, tracking system can prevent the truck from exiting a gate that is triggered by the tape node.

In one example, a gateway node (gateway device, tape node, or other wireless device) associated with the gate receives a communication from each tracking device associated with an asset that is going to pass through the gate The gateway node checks for any alerts of a rule violation from the tracking devices passing through the gate If an alert is received, the gateway node instructs the gate to close or remain closed Asset modules (e.g., tracking device on container or asset) speak to each other and to gateway nodes/devices.

Alarm module (e.g., gateway node or device that scans for alert transmissions from the asset modules or other alarm modules). Alarm modules may be associated with an a physical alarm (e.g., emergency notification system, alarm system, audiovisual alarm system, etc.). The alarm module triggers an alarm, relays instructions from the tracking system to another device to lock a gate/do not open a gate; relays instructions to equipment (e.g., conveyer belt) to shut-off or take other actions; sends data to server; sends messages to gate, text to guard at gate, foreman of facility (e.g., with instructions to inspect trailer A); etc.

Tracking system performs DETECTION, VALIDATION (can happen simultaneously to Detection, in one tape; or can happen on different devices), and DECISION MAKING.

DETECTION comprises detecting events that correspond to a violation of rules for a group of assets VALIDATION comprises validating whether detected events or received alerts corresponding to a violation of rules are accurate DECISION MAKING comprises determining actions to take in response to confirming that a violation of rules has occurred Tracking system can check for:

Proximity of assets to each other

Tracking system can detect violation of rules related to proximity of assets

If assets are sharing an enclosed space or area (e.g., truck trailer, room, storage area, etc.)

Tracking devices can be used to determine locations of each asset

In some cases, tracking devices can determine if assets are in the same area or room E.g., the tracking devices can detect if they are in a room based on communications with a gateway device associated with the room E.g., the tracking devices can detect if they are within a geofenced area corresponding to a room or area of interest Based on determined location, can detect if assets are sharing an enclosed space or area Tracking system can detect violation of rules related to sharing an enclosed space or area Large volumes or quantities of material being stored or transported together Tracking devices on assets can communicate with each other to determine a volume or quantity of a material or asset being stored or transported together Tracking system can detect violation of rules based on a maximum or minimum quantity or volume of material that should be transported or stored together Mixing of types of materials:

In some cases, rules may establish that a subset of materials or assets in a group may be stored or transported together, but not all materials and assets in a group can be stored or transported together

- Tracking system can detect which of the materials or assets are stored together, and can detect violations of the rules
- How do we know what materials can or can't be mixed?
- First option: Tracking devices that are used for specific types of assets store an identifier for the type of asset. Tracking devices for different types of assets may have physical or visible differences (e.g., tape nodes for containers storing crude oil are colored brown).
- Tracking device identifies itself to other tracking devices during communications and stores a table of identifiers for the different types of assets that it is mixed together with. Tracking system can determine mixing of assets based on the tables.
- Second option: Tracking device that is associated with an asset receives rules for the asset from a mobile device that wirelessly transmits (e.g., via Bluetooth) the rules and relevant data to the tracking device. Alternatively, Tracking device receives specific logic and rules relevant to the asset from the cloud/system (data can be relayed through another node of the wireless tracking system, e.g., a client device, another tape node, a gateway device, etc.).
- Third option: Tracking devices include a sensor that can be used to detect rules violations or hazardous materials (e.g., a gas sensor; a pH strip; temperature sensor; infrared spectroscopy; other sensors).
- When the tracking device detects an event or condition related to a rules violation, it broadcasts the rules violation to other wireless devices within its communication range
- For example, a material stored in a container may become hazardous if it's exposed to a temperature higher than a threshold temperature. A tracking device on the container tracks the temperature and reports if the container has been exposed to temperatures higher than the threshold temperature.
- Tracking system may include a "Checklist" of materials
- The wireless tracking system accesses database. The database may be in the form of a graph where every node in the graph represents a material or asset and every edge between nodes represents whether the nodes can be mixed together, without violating a rule. Based on the graph, the wireless tracking system maps the edge between two nodes to determine whether the two materials or assets can be mixed. In some embodiments, each edge have a "risk factor" which indicates a danger or risk level if the two materials or assets are mixed. Mixed refers to storing, transporting, or positioning two assets or materials in proximity to each other.
- In further embodiments, Rules are applied to the graph
- E.g., a rule may establish that two nodes corresponding to flammable materials CANNOT be mixed
- Each node can have intrinsic risk factors as well (e.g., flammable; environmental hazard) that is stored in the graph/database Detection

- Tracking devices communicate wirelessly with each other over, e.g., LoRa or Bluetooth or other local area network
- The wireless communications have a corresponding range bounded by the local area network used
- Tracking system can determine a maximum distance that two wireless devices are from each other based on the communications and the corresponding range

- Milestone devices (i.e. milestone nodes) can be used to determine if assets with tracking devices have entered an area associated with the milestone device
- The milestone device may be an embodiment of a tape node, a tracking device, a gateway device, a client device, or some other wireless device that is associated with the area
- The milestone device is associated with a geofenced area—e.g., the hazardous waste location. If any asset of a certain nature with an associated tracking device on it enters that area, it is detected
- The milestone device may detect prohibited assets entering the area (e.g., an asset may be prohibited because a maximum amount of hazardous materials are already stored in the area).
- Egress point devices (i.e., egress point nodes) may be used to detect when an asset of a certain nature passes through or is in proximity to an egress point (e.g., a door, an exit/entrance, a gate, loading bay, door of a vehicle, door of a trailer or tractor bed, etc.).
- The egress point device may be an embodiment of a tape node, a tracking device, a gateway device, a client device, or some other wireless device that is associated with the egress point
- The egress point node may communicate with tracking devices on assets as they pass by the egress point
- The egress point node detects when an asset of a certain nature passes through the egress point
- E.g., the egress point node may raise an alarm to the wireless tracking system if an asset is inappropriately removed from an area through the egress point Example 1 Stages of Material Processing Two 55-gal drums of material A that needs to go through some processing. Raw material A can be processed, changing the raw material A to intermediate material A. The intermediate material A can be further processed changing the intermediate material A to final material A. According to safety regulation, raw material A can't be mixed with intermediate material A. However, final can be mixed with final, raw, or intermediate. So different stages of the material A must be handled differently.

- Status of the material can be identified using a two-part identifier, the first part of the identifier identifies the base material; the second part of the identifier identifies the stage of material (e.g., raw, intermediate, final)
- Can track the drum of material A through its processing lifetime using tracking devices and wireless tracking system. The wireless tracking system can issue notifications to the tracking device that the material has been processed, change the part of the identifier representing stage.
- If violations of the safety regulations occur, the tracking devices can detect improper mixing of different stages of materials and notify the wireless tracking system Example 2 Environmental Conditions

- Tracking device with an integrated sensor can detect environmental conditions of an asset and determine if mixing the asset with a group of assets violates a rule for the group of assets For example, if one drum of a material has been stored with exposure to sunlight, it may experience high temperatures that make it hazardous to be mixed with other drums of the material. The tracking device includes a sensor (e.g., light sensor, temperature sensor, etc.) to detect if the drum has potentially experienced the hazardous conditions. In an alternate embodiment, the tracking device does not include a sensor but can detect if it is located on the outside of a building and determines it has had sunlight exposure based on the detected location.

The tracking device will store data indicating that it has experienced the hazardous conditions and will detect if the asset is mixed with other assets, where it is now unsafe to mix the asset with the other assets In response, the tracking device will transmit an alert to other nodes of the wireless tracking system Other hazardous conditions include if one drum has been dropped, jostled, or improperly handled: Temperature difference, or adulteration of other kind of tampering that may create conditions where it's undesirable for them to be mixed with other assets.

What is the nature of the container or asset? The nature of the container/asset stored on a memory of the tracking device when it is applied/installed on the container/asset.

For smaller bins/containers, e.g., having multiple waste products: Apply a tape node to the bin/container itself; detect if something happens that might indicate an undesirable condition (e.g., heat production may indicate chemical reaction between components in the bin, or may indicate mishandling that needs to be addressed).

These tapes may operate within hazardous material zones that operate within certain regulations. The zones may require certain structural soundness/material requirements for the containers, as they may be at risk of explosions.

Example 3—Keeping Assets Together

Make sure that things are packaged together rather than making sure they are shipped separately or separated during transport e.g., for just-in-time manufacturing, it is important that all parts of required equipment are shipped together to make sure they come in at the same time If a Material A is only functional with Material B, and a tracking device A associated with Material A detects that a tracking device B associated with Material B is not nearby, tracking device A can alert the cloud rather than waiting. Tracking device A may do this, for example, by initiating a phone call or sending an SMS text message to the wireless tracking system.

Additionally, the wireless tracking system may initiate a change in a work environment. E.g., sounding an alarm in a building to make sure that it the material A and material B are located and grouped together again to resolve the separation.

The change in the work environment can be, for example, an evacuation order; an instruction to check contents of a trailer, room, or area; an order to intercept trailer; an order to modify materials loaded onto a trailer or in a room.

INPUT TO tracking device: Knowledge of journey, transportation, destination, etc.

Tape nodes already receive information describing this—e.g., so that we can conserve battery life accurately, so that we know when to turn on airplane mode Check: What plane or trailer is it on? What train is it on? How long will this journey take to the destination?

Some materials cannot be on a plane—can detect, e.g., based on air pressure

Some materials require cold storage—can detect if type of transportation is not going to be able to maintain temperature for entire length of journey Generalize modality Include RFID and other forms—do not limit to tape nodes.

Tracking device as discussed throughout may be an embodiment of a tape node, but it is not limited thereto.

What happens if, in a room of 10 tapes, 2 tapes indicate hazardous mixing while 8 tapes indicate no hazardous mixing?

Tapes have a history and a known reliability

Can determine based on known reliability whether it is "worth" raising an alarm

Newly applied tape nodes may not be 100% known as "working"

Whereas tape that has been sending correct signals for 4 days may have a better reliability score Can essentially crowd-source whether one tape node possibly has a broken sensor

ADDITIONAL CONFIGURATION INFORMATION

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:

a control system on a server; and a first tracking device associated with a first physical asset and having:

a first wireless communication system; and a first memory storing:

a first asset type defining a type of the first physical asset, wherein the first asset type is not unique to the first physical asset; and at least one rule corresponding to the first asset type and defining a threshold distance for a second asset type, wherein the at least one rule is a portion of a database downloaded from the server; and an egress point node associated with an egress location, the egress point node configured to wirelessly communicate with the first tracking device and control a physical barrier at the egress location, wherein the first tracking device determines a violation of the at least one rule when (a) a wireless message received from a second tracking device attached to a second physical asset indicates that the second physical asset is of the second asset type and (b) the wireless message indicates a distance between the first physical asset and the second physical asset violates the threshold distance, and wherein the first tracking device, in response to the violation, transmits an alert to the egress point node, and wherein the egress point node, in response to the alert, instructs the physical barrier to close or remain closed.

2. The system of claim 1, wherein the first tracking device determines the distance based on a received signal strength of the wireless message and based on a communication range associated with the first wireless communication system.

3. The system of claim 1, wherein the threshold distance defines a minimum distance and the distance is less than or equal to the threshold distance.

4. The system of claim 1, wherein the threshold distance defines a maximum distance and the distance is greater than or equal to the threshold distance.

5. A method comprising:

monitoring, by a first wireless tracking device associated with a tracking system, a first physical asset of a first type that is not unique to the first asset, wherein at least one rule defines a threshold distance between assets of the first type and assets of a second type;

receiving, by the first wireless tracking device, a wireless communication indicating a presence of a second wireless tracking device associated with a second physical asset;

determining, by the first wireless tracking device, that the second asset is of the second type based on the wireless communication;

determining a distance between the first wireless tracking device and the second wireless tracking device based on the wireless communication;

determining, by the first wireless tracking device, that the at least one rule is violated when the first physical asset is of the first type, the second physical asset is of the second type, and the distance violates the threshold distance; and transmitting, by the first wireless tracking device that wirelessly communicate with an egress point node, an alert corresponding to the violation of the at least one rule to the egress point node of the tracking system associated with an egress location, wherein the egress point node is configured to, in response to receiving the alert, instruct and control a physical barrier at the egress location to close or remain closed.

6. The method of claim 5, wherein the wireless communication is with another wireless node of the tracking system.

7. The method of claim 5, wherein the first wireless tracking device comprises:

a processor;

a memory; and a first type of wireless communication system, wherein the first wireless tracking device is configured to wirelessly communicate with other wireless nodes of the tracking system using the first type of wireless communication system.

8. The method of claim 5, wherein the wireless communication is received directly from the second wireless tracking device, the method further comprising:

estimating, by the first wireless tracking device, the distance based at least in part on the wireless communication.

9. The method of claim 8, wherein the transmitting the alert comprises a request for the first asset or the second asset to be relocated.

10. The method of claim 5, wherein the at least one rule comprises a second rule that the asset be located within threshold distance from a second asset.

11. The method of claim 5, further comprising gathering sensor data from at least one sensor of the wireless tracking device.

12. The method of claim 11, wherein determining that the at least one rule is being violated is based at least in part on the gathered sensor data indicating a sensor measurement that is above or equal to a threshold value defined by the at least one rule.

13. The method of claim 11, wherein determining that the at least one of the rule is being violated is based at least in part on the gathered sensor data indicating a sensor measurement that is below or equal to a threshold value defined by the at least one rule.

14. The method of claim 11, wherein the at least one sensor is selected from the group consisting of a vibration sensor, a temperature sensor, a heat sensor, an accelerometer, a motion sensor, a light sensor, a chemical sensor, a magnetometer, an electromagnetic field sensor, a capacitive sensor, a resistive touch sensor, an electrical impedance sensor, an electrical current sensor, a moisture sensor, and a pressure sensor.

15. A method comprising:

monitoring, by a wireless tracking device associated with a tracking system, an asset, wherein the wireless tracking device has at least one rule downloaded from a database of the tracking system into a memory of the wireless tracking device based on an asset type of the asset;

detecting, by the wireless tracking device using at least one sensor of the wireless tracking device, conditions of the asset or of an environment of the asset;

determining, by the wireless tracking device, based on the detected conditions that the at least one rule is violated; and responsive to the determining that the at least one rule is violated, wirelessly transmitting, by the wireless tracking device using a first type of wireless communication system, an alert to an egress point node associated with an egress location, wherein the egress point node is configured to, in response to receiving the alert, instruct and control a physical barrier at the egress location to close or remain closed, and wherein the alert includes instructions to intervene with the asset to resolve the rule violation.

16. The method of claim 15, further comprising:

receiving, by the wireless tracking device, confirmation from the client device that the alert was received and the user has completed intervening with the asset to resolve the violation of the at least one rule.

17. The method of claim 16, further comprising:

detecting, at a later time by the wireless tracking device, new conditions of the asset or of the environment after the transmitting of the alert;

determining, by the wireless tracking device, based on the new conditions that the at least one rule is not violated; and discontinuing, by the wireless tracking device, wireless transmission of the alert.

18. The system of claim 1, wherein at least one of the first asset type and the second asset type has a plurality of assets.

19. The method of claim 5, wherein at least one of the first type and the second type has a plurality of assets.

20. The method of claim 15, wherein the asset type has a plurality of assets.

* * * * *